(12) United States Patent
Katayama

(10) Patent No.: US 11,997,407 B2
(45) Date of Patent: May 28, 2024

(54) PHOTODETECTION DEVICE

(71) Applicant: SONY SEMICONDUCTOR SOLUTIONS CORPORATION, Kanagawa (JP)

(72) Inventor: Hidetoshi Katayama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/043,575

(22) PCT Filed: Aug. 11, 2021

(86) PCT No.: PCT/JP2021/029637
§ 371 (c)(1),
(2) Date: Feb. 28, 2023

(87) PCT Pub. No.: WO2022/054494
PCT Pub. Date: Mar. 17, 2022

(65) Prior Publication Data
US 2023/0283923 A1 Sep. 7, 2023

(30) Foreign Application Priority Data
Sep. 8, 2020 (JP) .................................. 2020-150643

(51) Int. Cl.
*H04N 25/709* (2023.01)
*H04N 25/77* (2023.01)

(52) U.S. Cl.
CPC ........... *H04N 25/709* (2023.01); *H04N 25/77* (2023.01)

(58) Field of Classification Search
CPC .... H04N 25/78; H04N 25/779; H04N 25/766; H04N 25/626; H04N 25/76; H04N 25/77; H04N 25/70; H04N 25/709
See application file for complete search history.

(56) References Cited

U.S. PATENT DOCUMENTS 5,777,508 A * 7/1998 Sawanobori ........... H04N 25/53 348/311
9,018,573 B2 * 4/2015 Kamiyama ............ H04N 25/53 250/208.1

(Continued)

FOREIGN PATENT DOCUMENTS

JP 7-336610 A 12/1995
JP 2003-303890 A 10/2003

(Continued)

OTHER PUBLICATIONS

International Search Report and Written Opinion of PCT Application No. PCT/JP2021/029637, dated Sep. 21, 2021, 09 pages of ISRWO.

*Primary Examiner* — John R Lee
(74) *Attorney, Agent, or Firm* — CHIP LAW GROUP

(57) ABSTRACT

A photodetection device according to the present disclosure includes: a light-receiving pixel; a power supply terminal; a ground terminal; a switch; and a first discharge circuit. The light-receiving pixel includes a light receiver that generates electric charge corresponding to an amount of received light. The switch includes a first terminal and a second terminal. The first terminal is coupled to a first node led to the light receiver. The second terminal is coupled to a second node led to the power supply terminal. The switch couples the first node and the second node by being turned on. The first discharge circuit is coupled to the first node and a third node led to the ground terminal. The first discharge circuit is configured to discharge electricity from the third node toward the first node.

10 Claims, 16 Drawing Sheets

(56) References Cited

U.S. PATENT DOCUMENTS

| | | | |
|---|---|---|---|
| 10,044,960 B2* | 8/2018 | Mao | H04N 25/59 |
| 10,917,600 B2* | 2/2021 | Lin | H04N 25/76 |
| 11,252,356 B2* | 2/2022 | Yanagita | H04N 25/778 |
| 11,297,274 B2* | 4/2022 | Sato | H04N 25/77 |
| 11,431,926 B2* | 8/2022 | Johnson | H04N 25/71 |
| 11,470,275 B2* | 10/2022 | Kobayashi | H01L 27/14636 |
| 11,575,852 B2* | 2/2023 | Ito | H04N 25/772 |
| 11,582,410 B2* | 2/2023 | Bong | H04N 25/57 |
| 11,653,115 B2* | 5/2023 | Xhakoni | H04N 25/772 |
| | | | 348/294 |
| 2009/0101914 A1* | 4/2009 | Hirotsu | H01L 27/14643 |
| | | | 257/E31.079 |
| 2016/0307954 A1* | 10/2016 | Arima | H04N 23/54 |
| 2018/0247969 A1* | 8/2018 | Mori | H01L 27/14689 |
| 2019/0260950 A1* | 8/2019 | Yanagita | H04N 25/778 |
| 2020/0036921 A1* | 1/2020 | Funamizu | H04N 25/77 |
| 2020/0154070 A1* | 5/2020 | Lin | H04N 25/702 |
| 2020/0314371 A1* | 10/2020 | Yanagita | H04N 25/65 |
| 2020/0396409 A1* | 12/2020 | Posch | H04N 25/74 |
| 2021/0195126 A1* | 6/2021 | Palmigiani | H04N 25/771 |
| 2022/0360728 A1* | 11/2022 | Johnson | H04N 25/59 |
| 2023/0254604 A1* | 8/2023 | Hasegawa | H04N 25/78 |
| | | | 348/294 |
| 2023/0283923 A1* | 9/2023 | Katayama | H04N 25/709 |
| | | | 250/208.4 |

FOREIGN PATENT DOCUMENTS

| | | |
|---|---|---|
| JP | 2006-158116 A | 6/2006 |
| JP | 2006-238202 A | 9/2006 |
| JP | 2009-177866 A | 8/2009 |
| WO | 2015/099140 A1 | 7/2015 |

* cited by examiner

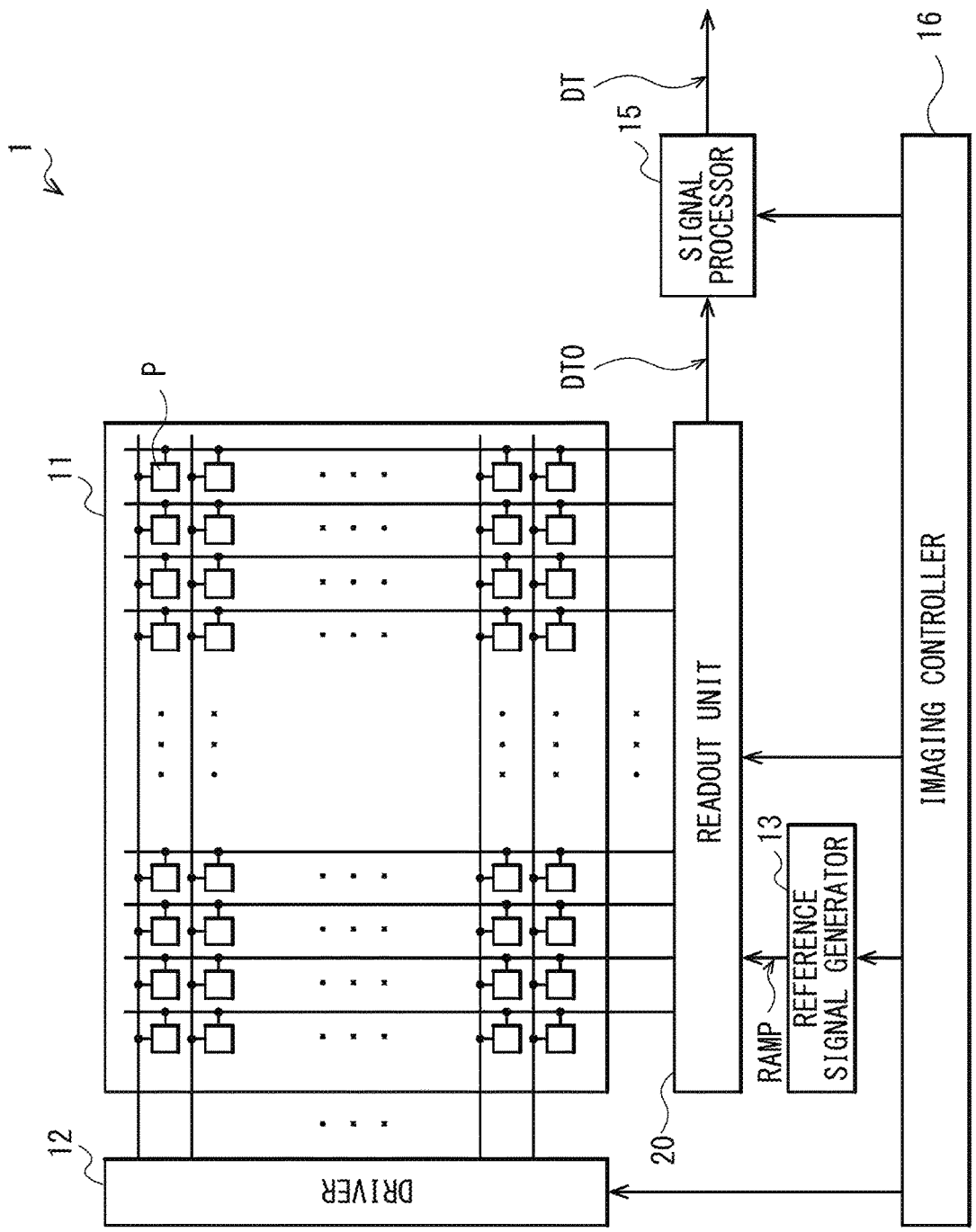
[FIG. 1]

[FIG. 2]
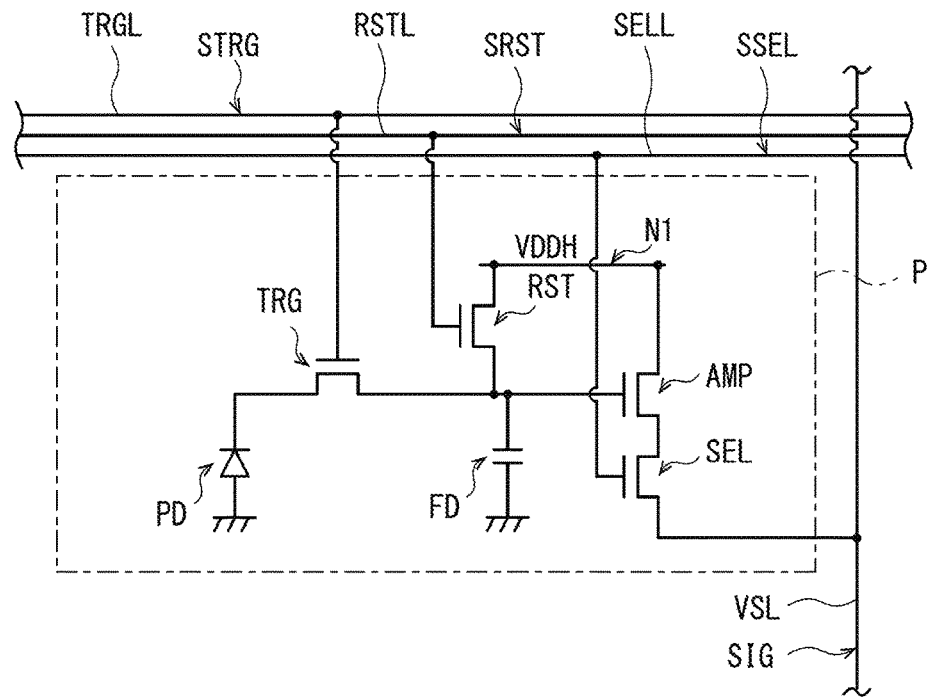
[FIG. 3]
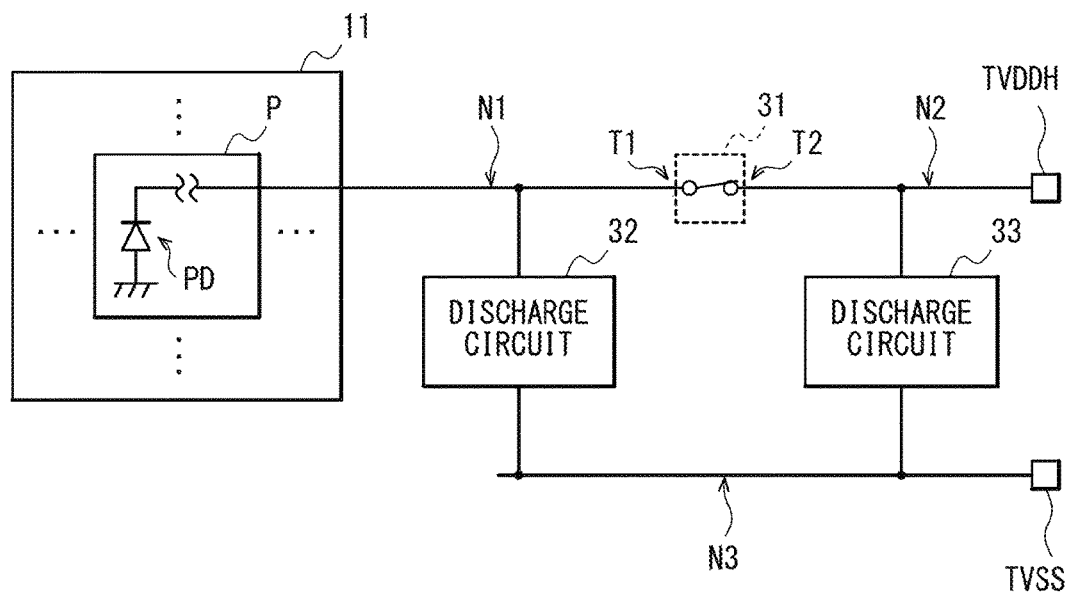

[FIG. 4]
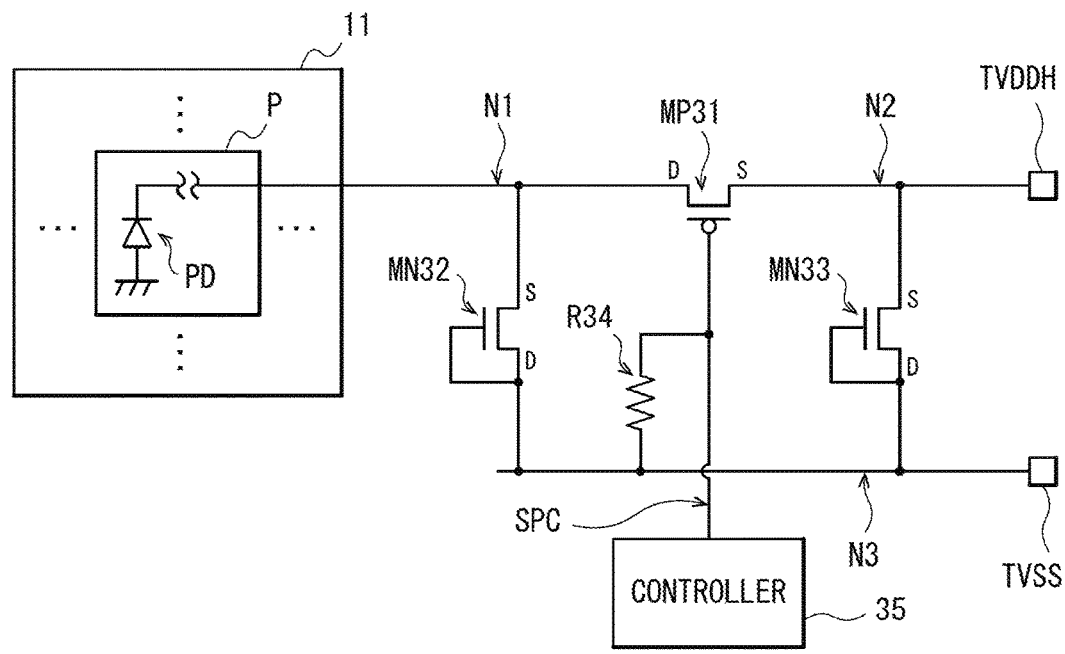
[FIG. 5]
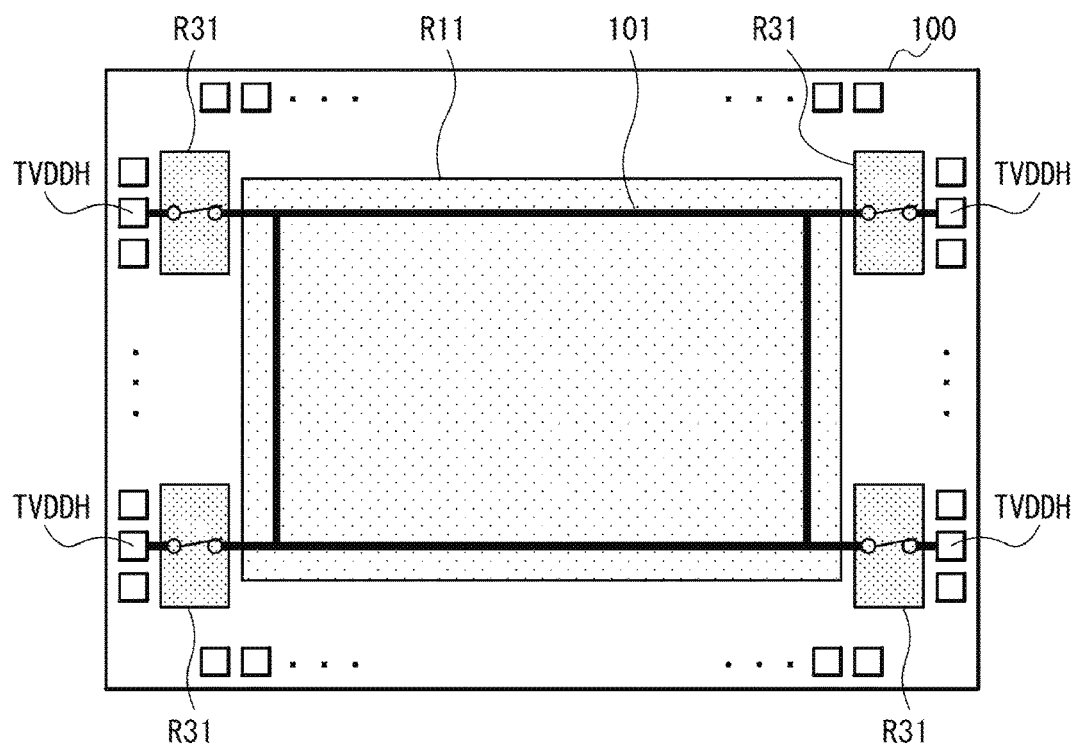

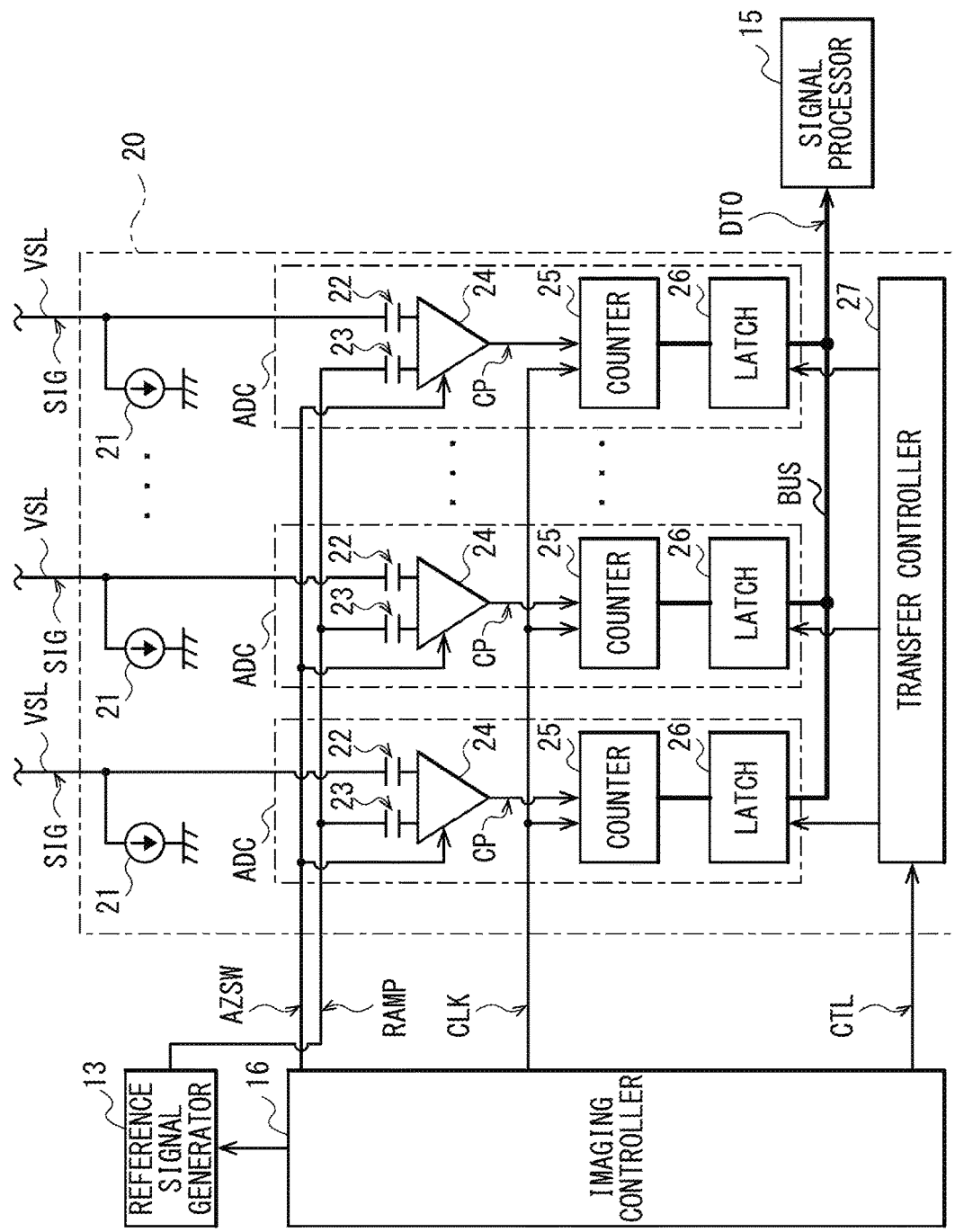
[FIG. 6]

[FIG. 7]
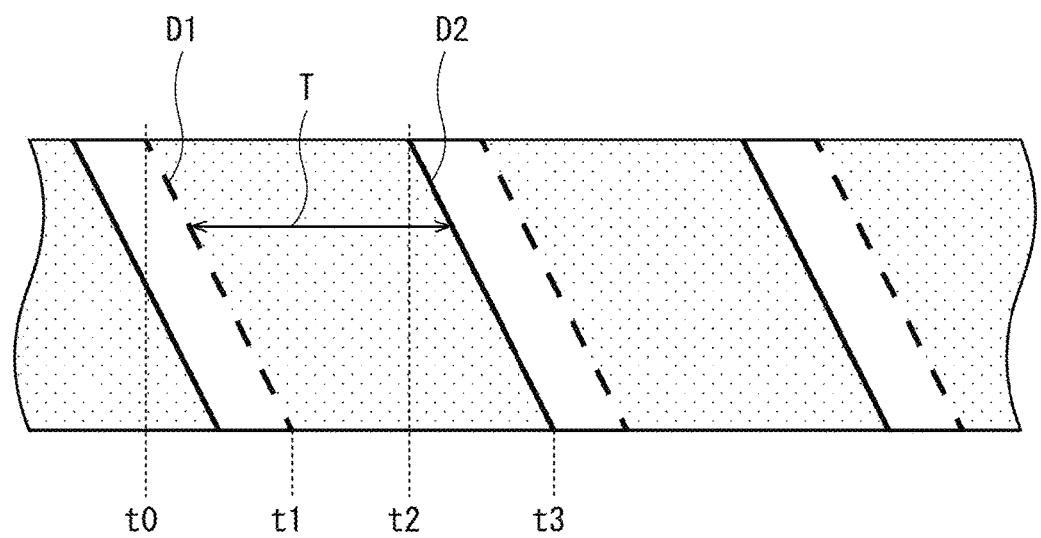

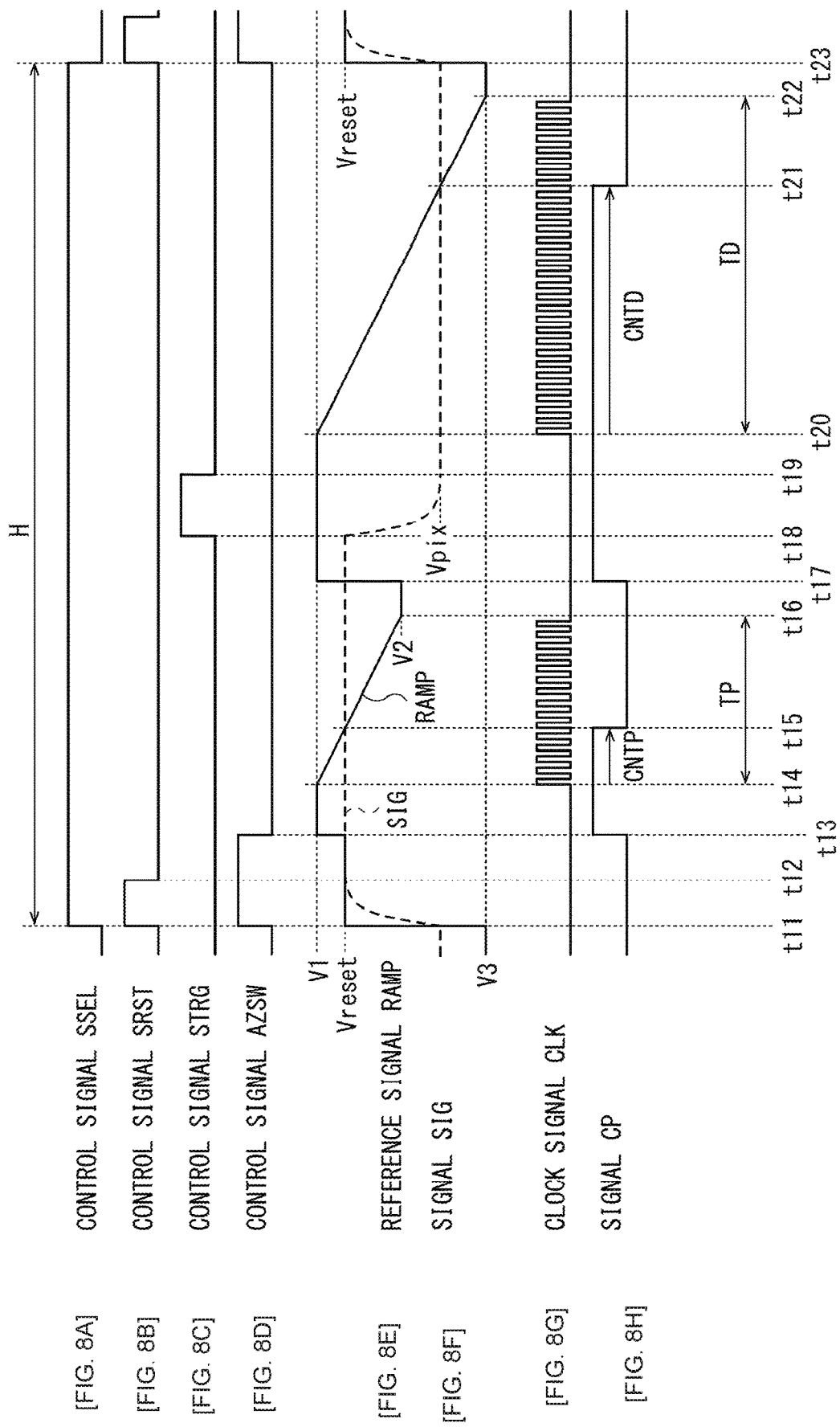

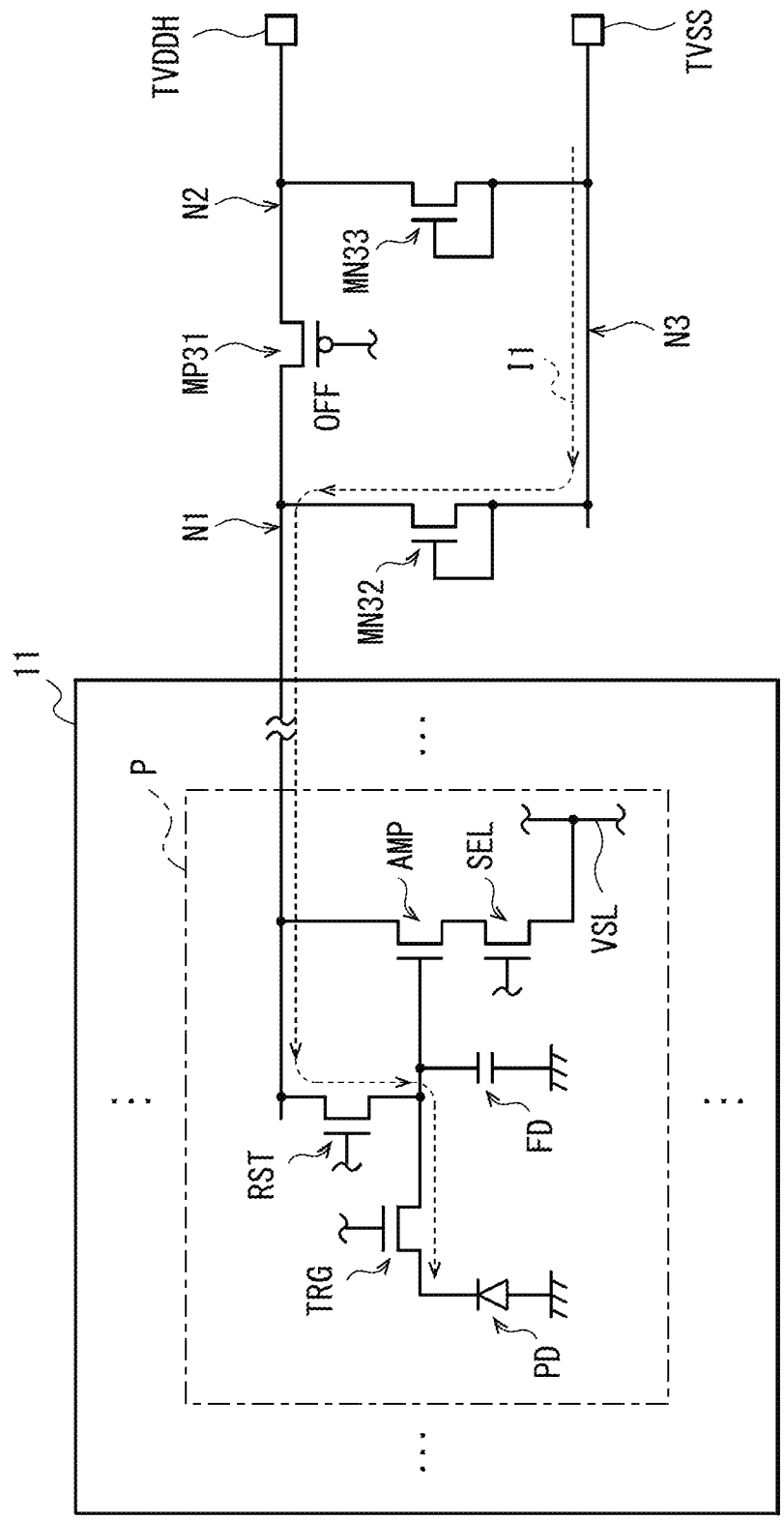
[FIG. 9]

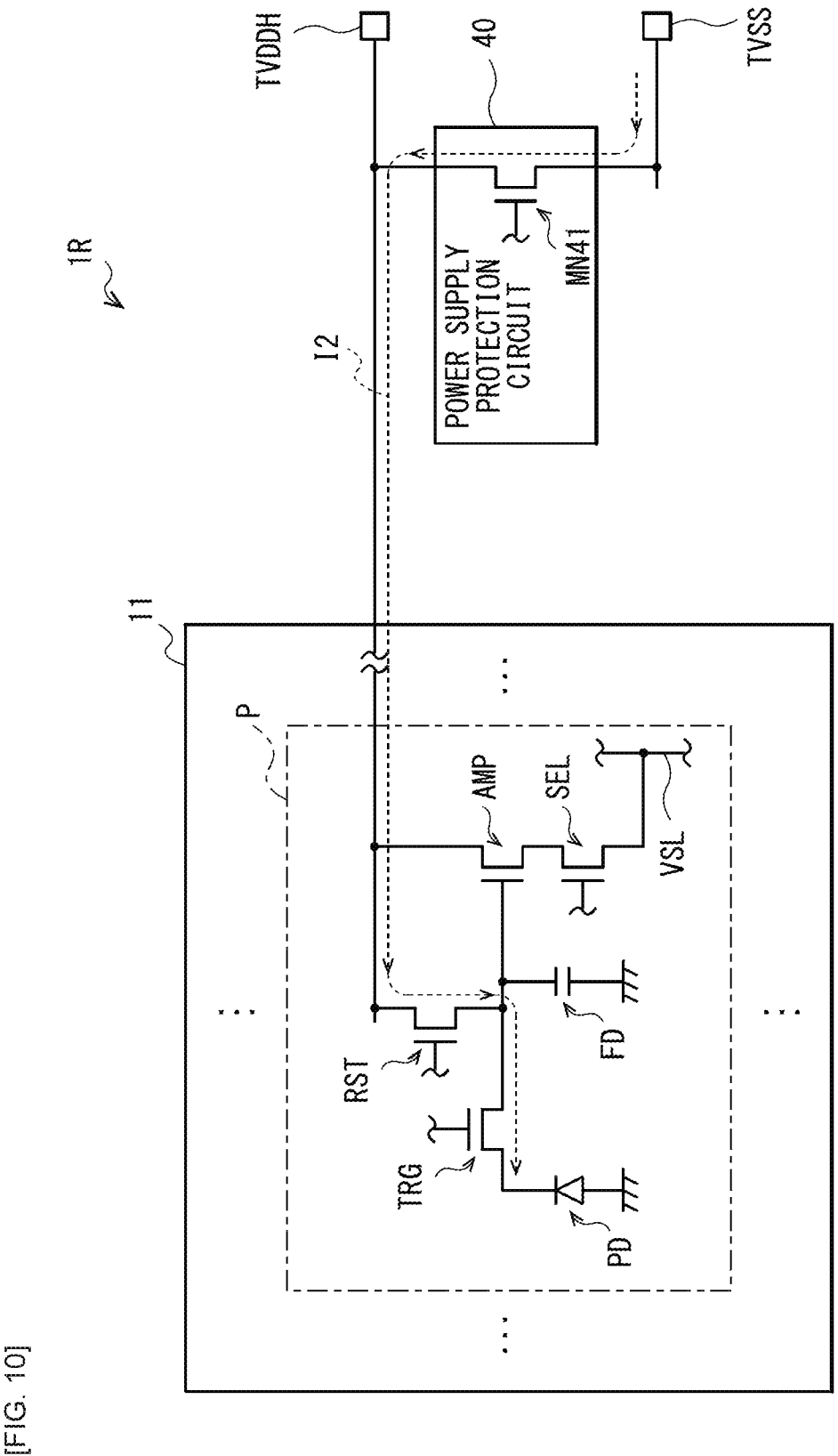
[FIG. 10]

[FIG. 11]
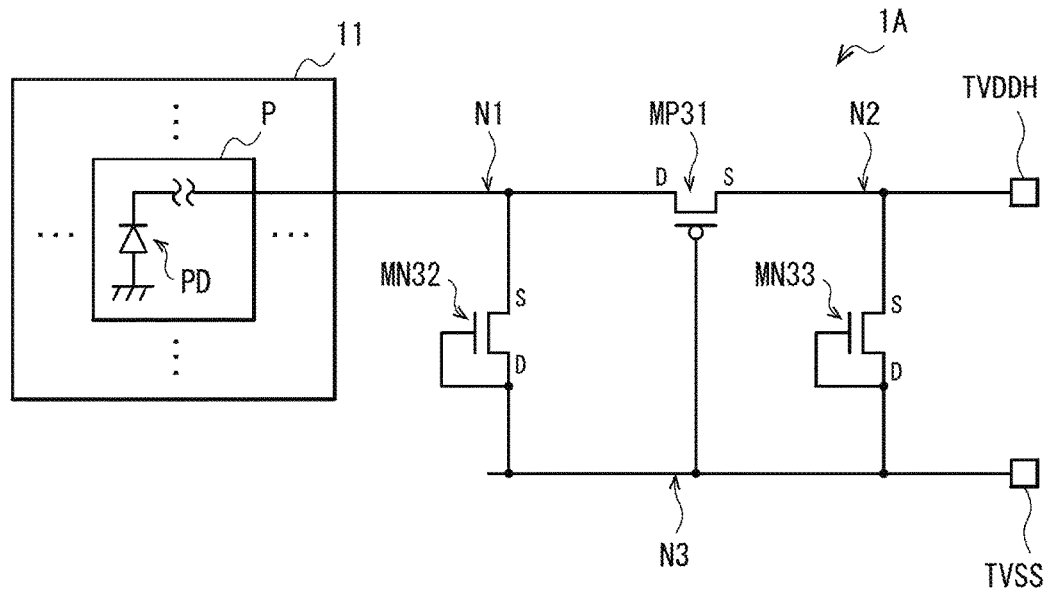
[FIG. 12]
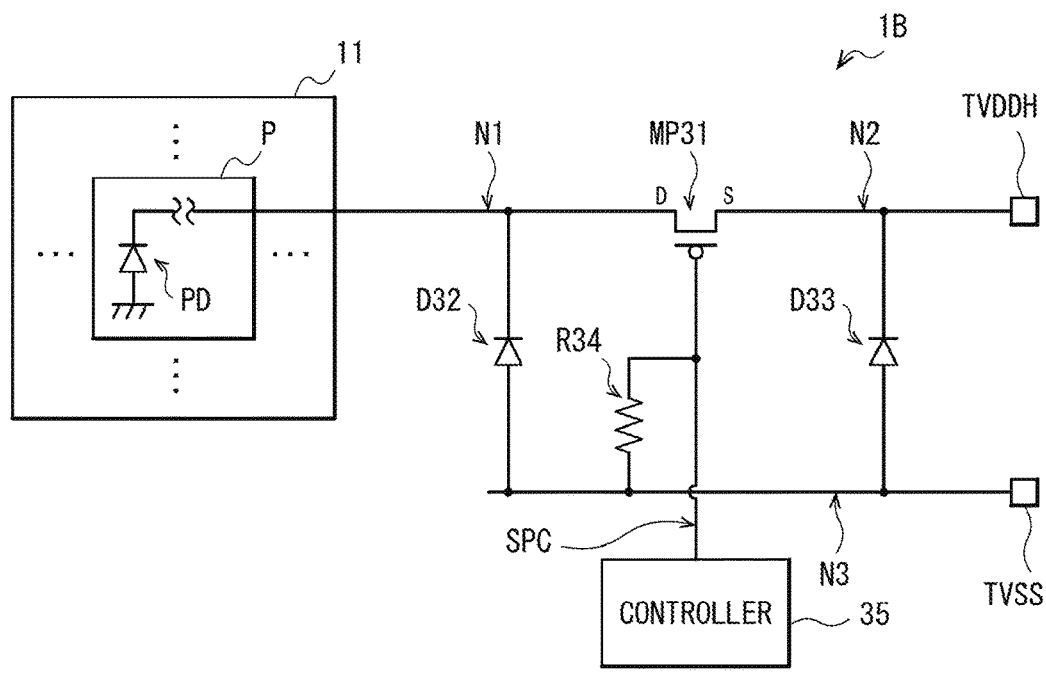

[FIG. 13]
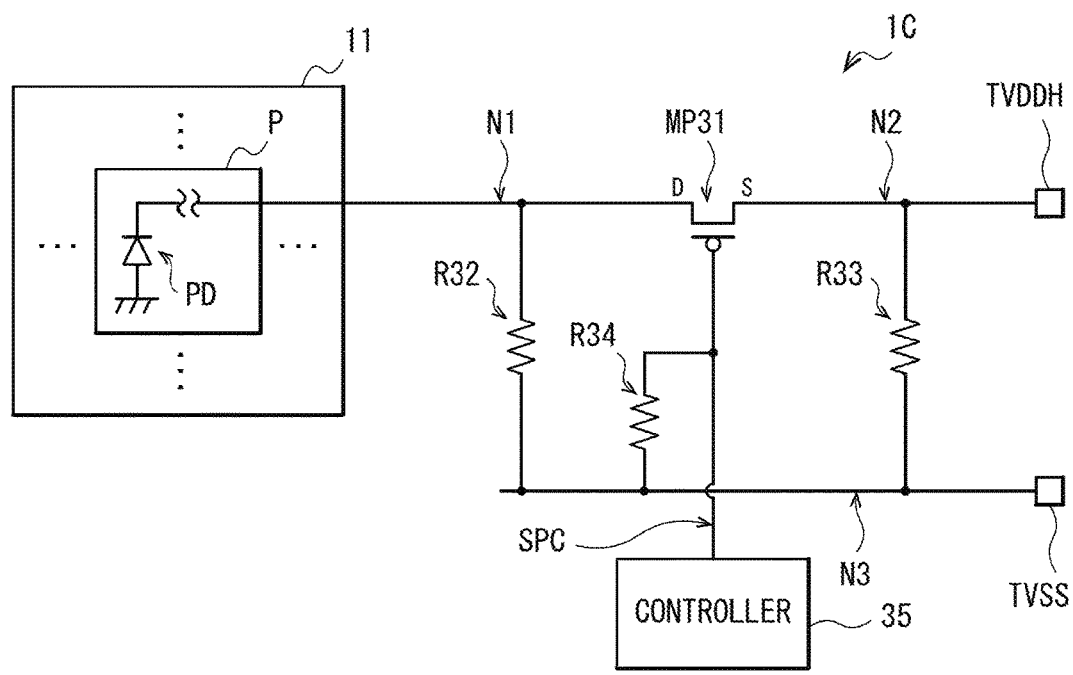
[FIG. 14]
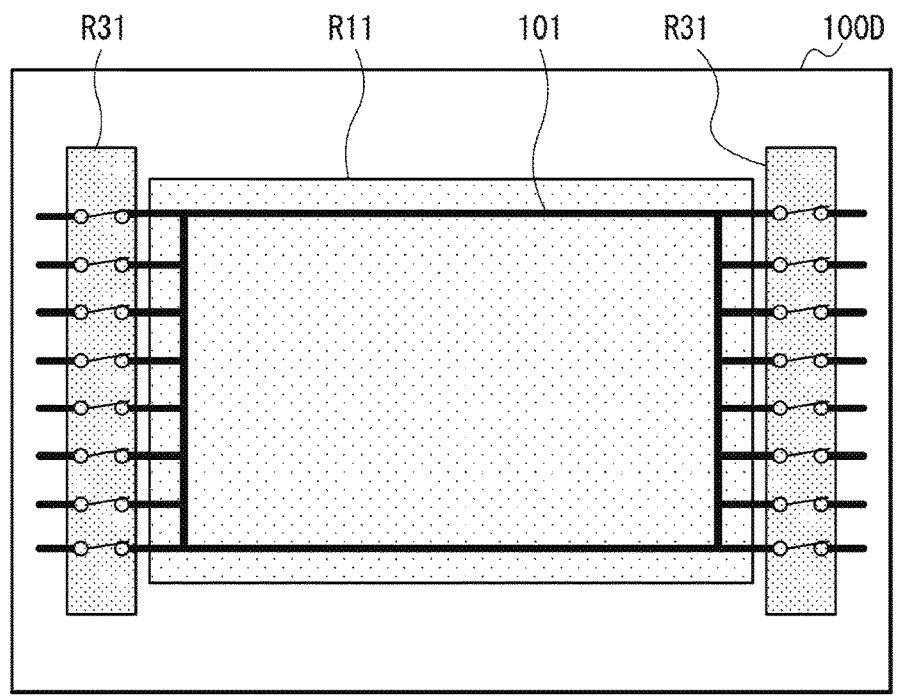

[FIG. 15]
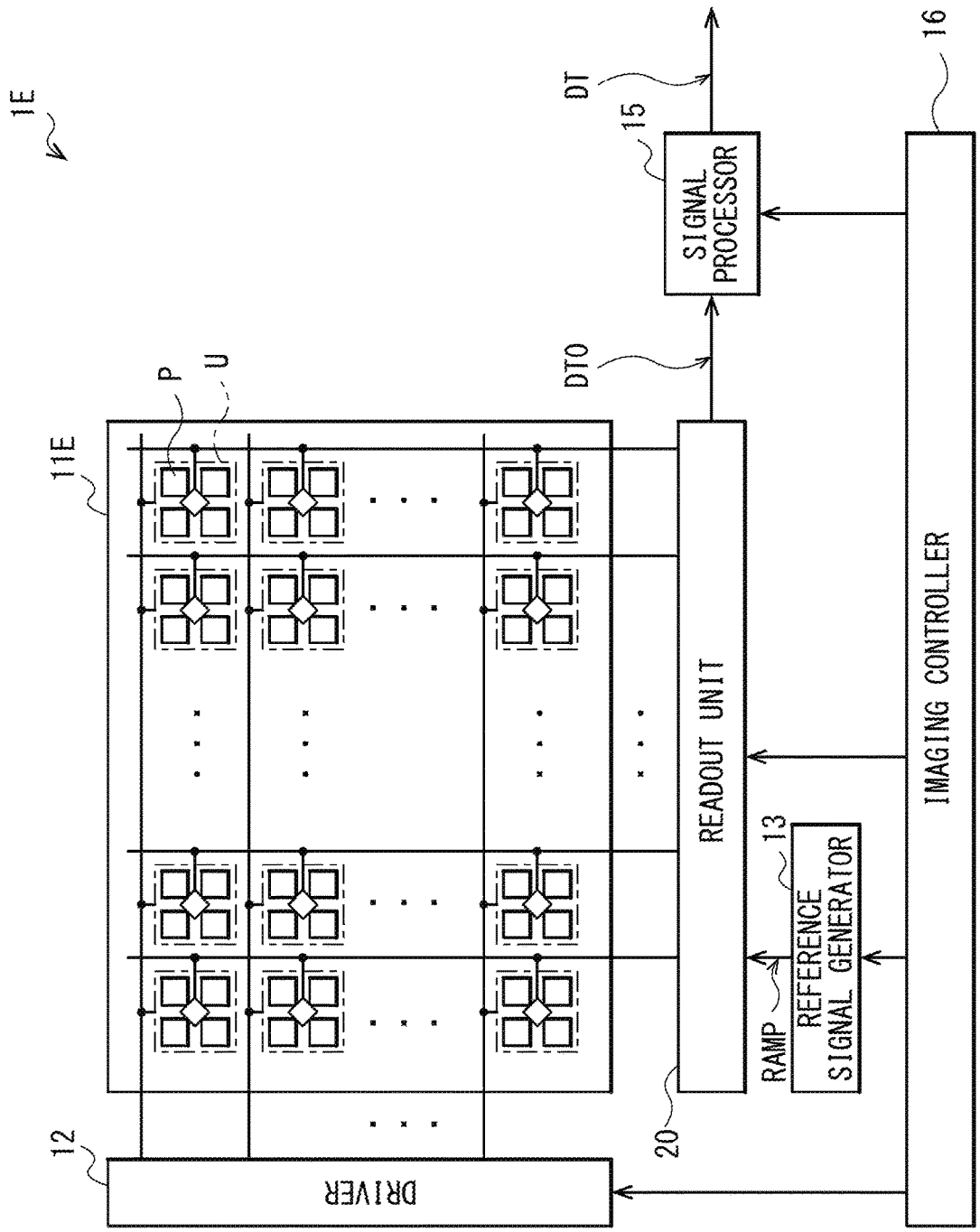

[FIG. 16]
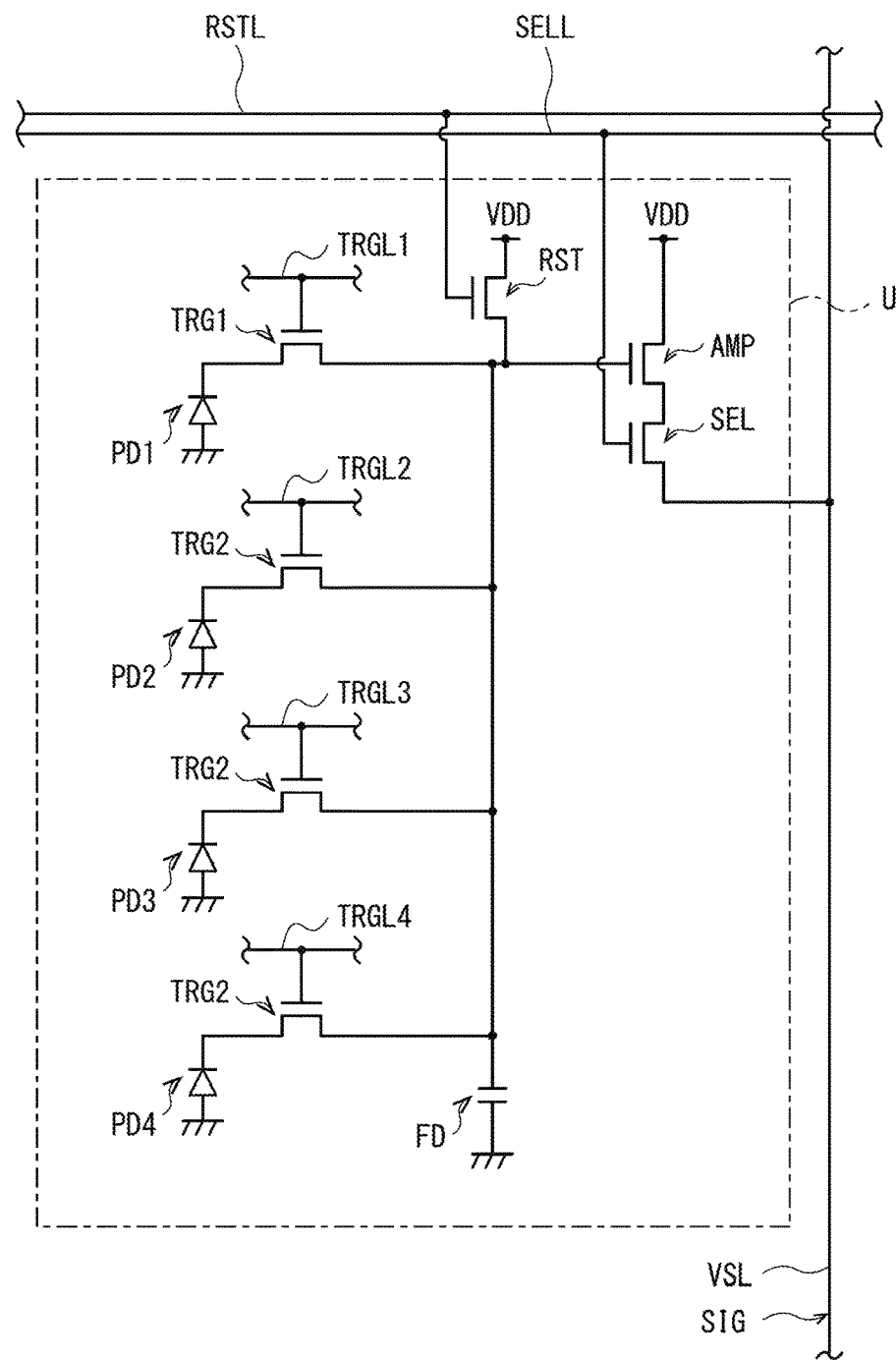

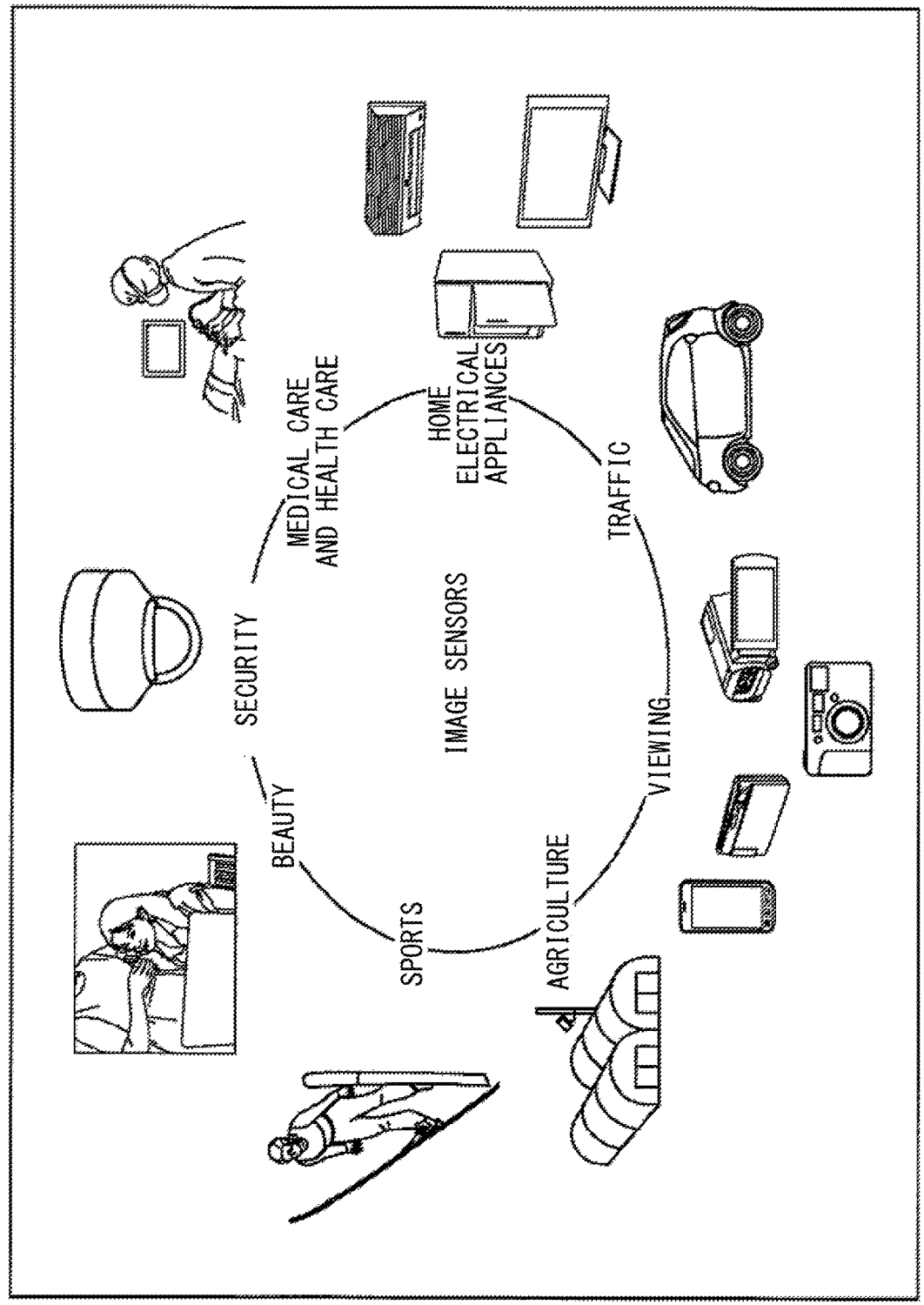
[FIG. 17]

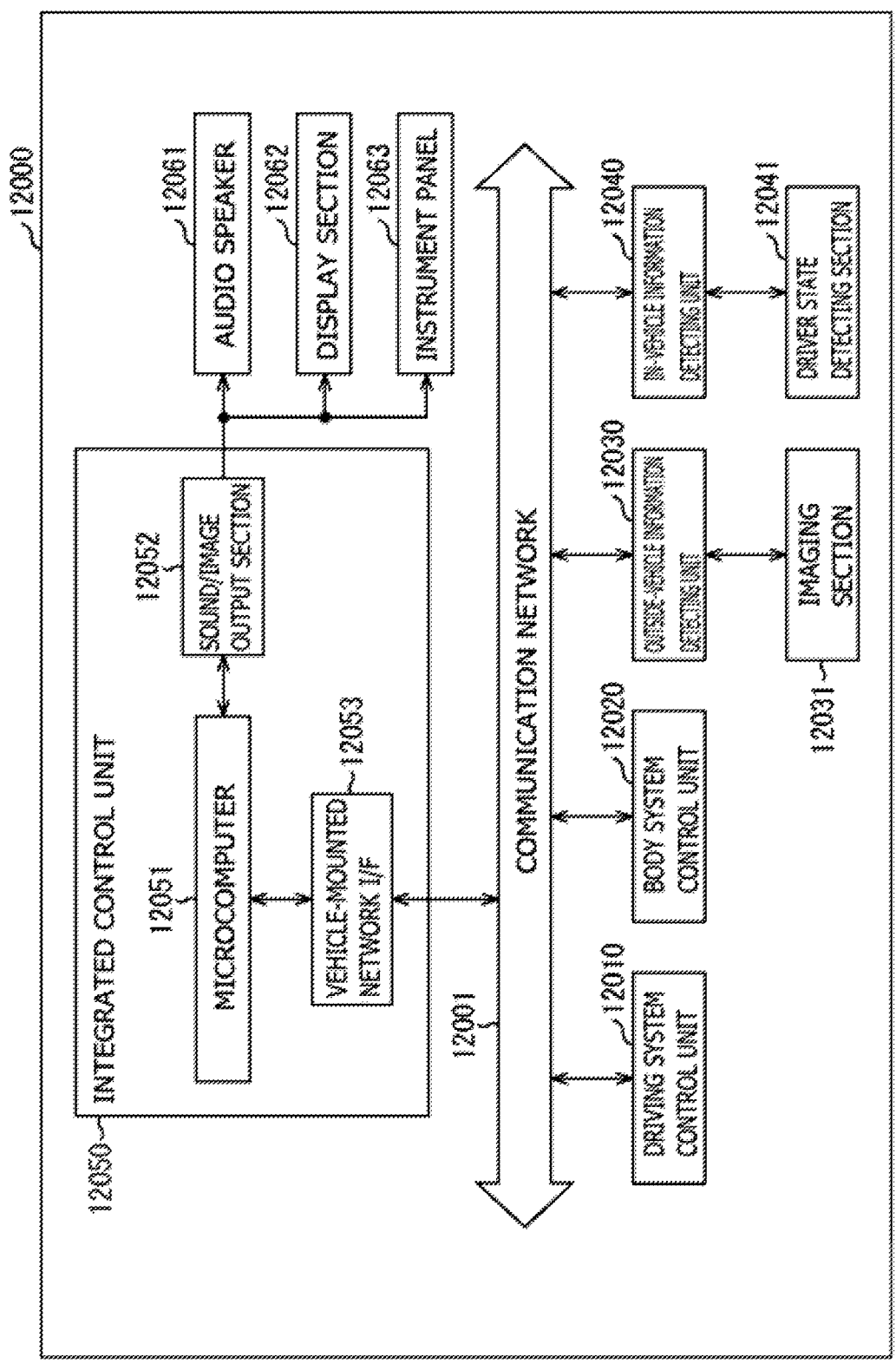
[FIG. 18]

[FIG. 19]
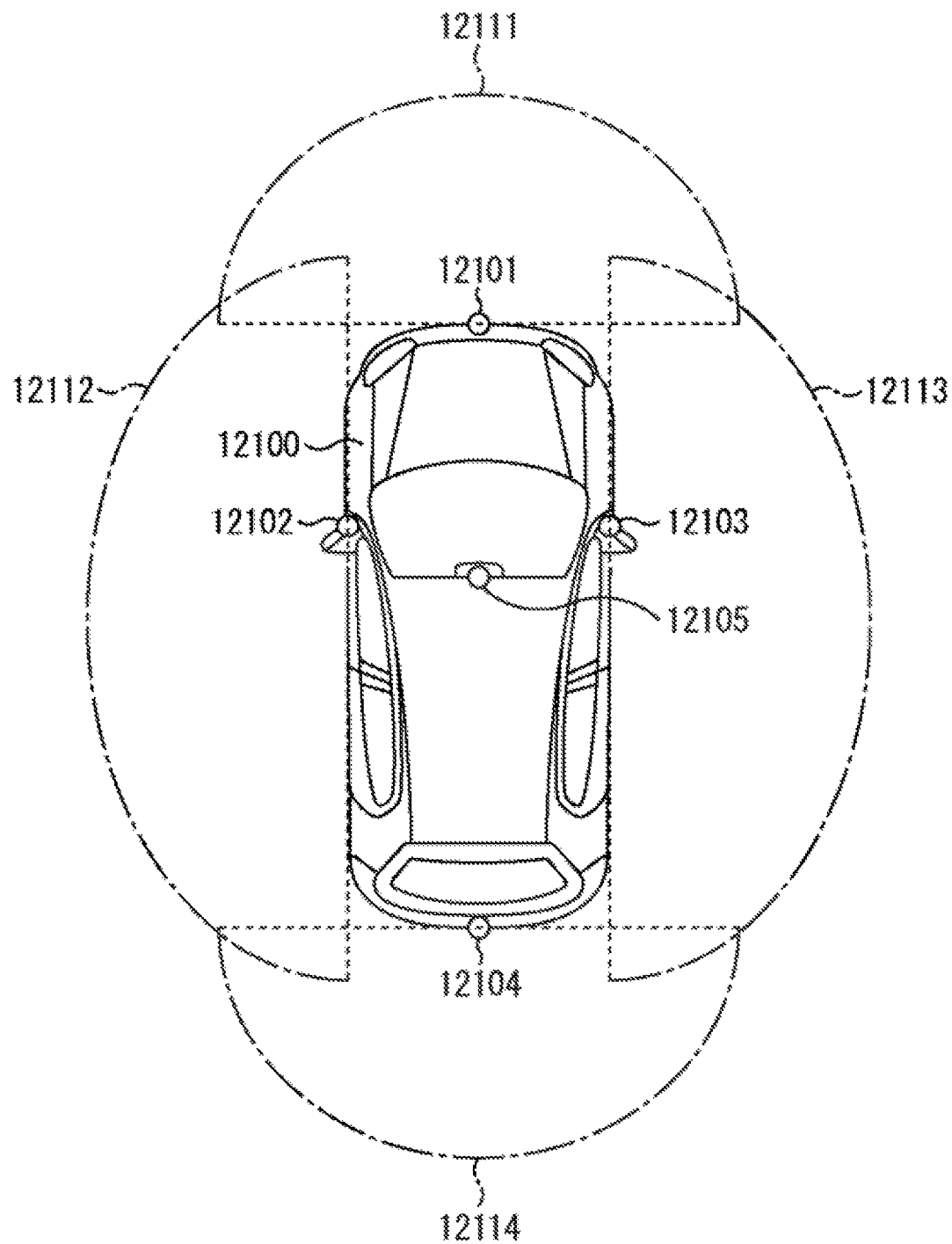

[FIG. 20]
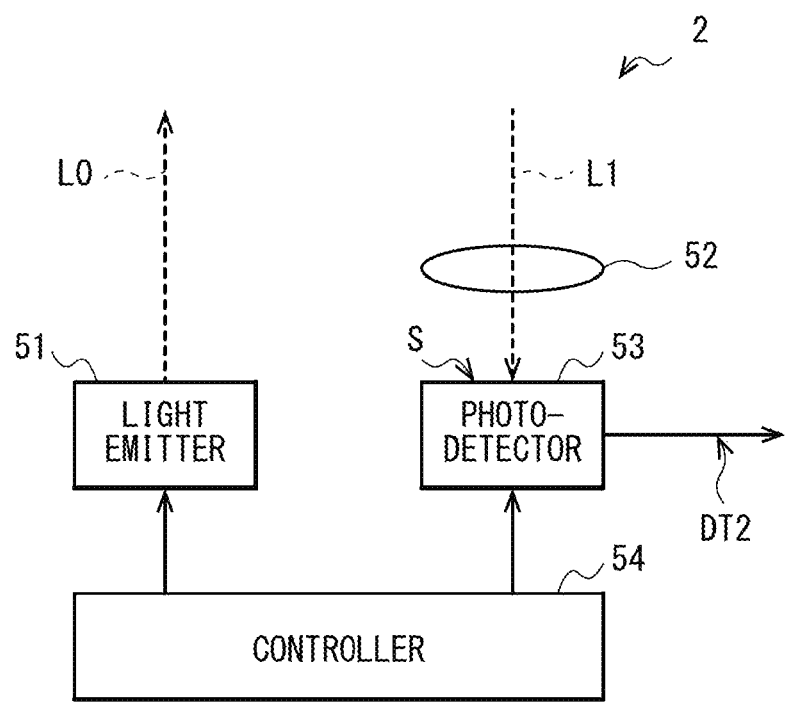

PHOTODETECTION DEVICE

CROSS REFERENCE TO RELATED APPLICATIONS

This application is a U.S. National Phase of International Patent Application No. PCT/JP2021/029637 filed on Aug. 11, 2021, which claims priority benefit of Japanese Patent Application No. JP 2020-150643 filed in the Japan Patent Office on Sep. 8, 2020. Each of the above-referenced applications is hereby incorporated herein by reference in its entirety.

TECHNICAL FIELD

The present disclosure relates to a photodetection device that detects light.

BACKGROUND ART

Semiconductor devices are each provided frequently with a protection circuit that protects a circuit from an overvoltage and an overcurrent. For example, PTL 1 discloses a protection circuit that protects a circuit from an overvoltage.

CITATION LIST

Patent Literature

PTL 1: Japanese Unexamined Patent Application Publication No. 2003-303890

SUMMARY OF THE INVENTION

In a photodetection device, a light receiver may generate electric charge corresponding to the amount of received light and this electric charge may cause a voltage even in a case where power supply to the photodetection device is stopped. It is therefore desired to protect a circuit from such a voltage corresponding to the amount of received light.

It is desirable to provide a photodetection device that is able to protect a circuit from a voltage corresponding to the amount of received light in a case where power supply is stopped.

A photodetection device according to an embodiment of the present disclosure includes: a light-receiving pixel; a power supply terminal; a ground terminal; a switch; and a first discharge circuit. The light-receiving pixel includes a light receiver that generates electric charge corresponding to an amount of received light. The switch includes a first terminal and a second terminal. The first terminal is coupled to a first node led to the light receiver. The second terminal is coupled to a second node led to the power supply terminal. The switch is configured to couple the first node and the second node by being turned on. The first discharge circuit is coupled to the first node and a third node led to the ground terminal. The first discharge circuit is configured to discharge electricity from the third node toward the first node.

In the photodetection device according to the embodiment of the present disclosure, the light receiver generates electric charge corresponding to the amount of received light. The switch includes the first terminal and the second terminal. The first terminal is coupled to the first node led to such a light receiver. The second terminal is coupled to the second node led to the power supply terminal. The first node and the second node are coupled by turning on this switch. The first discharge circuit is coupled to the first node and the third node led to the ground terminal. This first discharge circuit discharges electricity from the third node toward the first node.

BRIEF DESCRIPTION OF DRAWING

FIG. 1 is a block diagram illustrating a configuration example of an imaging device according to an embodiment of the present disclosure.
FIG. 2 is a circuit diagram illustrating a configuration example of a light-receiving pixel illustrated in FIG. 1.
FIG. 3 is a block diagram illustrating a supply path of a power supply voltage for a pixel array illustrated in FIG. 1.
FIG. 4 is a circuit diagram illustrating a specific example of the supply path of the power supply voltage illustrated in FIG. 3.
FIG. 5 is an explanatory diagram illustrating a disposition example of a transistor for a switch illustrated in FIGS. 3 and 4.
FIG. 6 is a block diagram illustrating a configuration example of a readout unit illustrated in FIG. 1.
FIG. 7 is a timing diagram illustrating an operation example of the imaging device illustrated in FIG. 1.
FIGS. 8A, 8B, 8C, 8D, 8E, 8F, 8G, and 8H are timing waveform diagrams illustrating an operation example of the imaging device illustrated in FIG. 1.
FIG. 9 is an explanatory diagram illustrating an example of a discharge operation of the imaging device illustrated in FIG. 1.
FIG. 10 is an explanatory diagram illustrating an example of a discharge operation of an imaging device according to a comparative example.
FIG. 11 is a circuit diagram illustrating a specific example of a supply path of a power supply voltage according to a modification example.
FIG. 12 is a circuit diagram illustrating a specific example of a supply path of a power supply voltage according to another modification example.
FIG. 13 is a circuit diagram illustrating a specific example of a supply path of a power supply voltage according to another modification example.
FIG. 14 is an explanatory diagram illustrating a disposition example of a transistor for a switch according to another modification example.
FIG. 15 is a block diagram illustrating a configuration example of an imaging device according to another modification example.
FIG. 16 is a circuit diagram illustrating a configuration example of a pixel unit illustrated in FIG. 15.
FIG. 17 is an explanatory diagram illustrating a usage example of the imaging device.
FIG. 18 is a block diagram depicting an example of schematic configuration of a vehicle control system.
FIG. 19 is a diagram of assistance in explaining an example of installation positions of an outside-vehicle information detecting section and an imaging section.
FIG. 20 is a block diagram illustrating a configuration example of a distance measurement device to which the present technology is applied.

MODES FOR CARRYING OUT THE INVENTION

The following describes embodiment of the present disclosure in detail with reference to the drawings. It is to be noted that description is given in the following order.
1. Embodiment
2. Usage Example of Imaging Device
3. Example of Application to Mobile Body

1. Embodiment

Configuration Example

FIG. 1 illustrates a configuration example of an imaging device 1 to which a photodetection device according to an embodiment is applied. The imaging device 1 includes a pixel array 11, a driver 12, a reference signal generator 13, a readout unit 20, a signal processor 15, and an imaging controller 16.

The pixel array 11 includes a plurality of light-receiving pixels P disposed in a matrix. The light-receiving pixels P are each configured to generate a signal SIG including a pixel voltage Vpix corresponding to the amount of received light.

FIG. 2 illustrates a configuration example of the light-receiving pixel P. The pixel array 11 includes a plurality of control lines TRGL, a plurality of control lines RSTL, a plurality of control lines SELL, and a plurality of signal lines VSL. The control lines TRGL each extend in the horizontal direction (lateral direction in FIG. 2). One end of the control line TRGL is coupled to the driver 12. The driver 12 supplies this control line TRGL with a control signal STRG. The control lines RSTL each extend in the horizontal direction. One end of the control line RSTL is coupled to the driver 12. The driver 12 supplies this control line RSTL with a control signal SRST. The control lines SELL each extend in the horizontal direction. One end of the control line SELL is coupled to the driver 12. The driver 12 supplies this control line SELL with a control signal SSEL. The signal lines VSL each extend in the vertical direction (longitudinal direction in FIG. 2). One end of the signal line VSL is coupled to the readout unit 20. This signal line VSL transmits the signal SIG generated by the light-receiving pixel P to the readout unit 20. The plurality of light-receiving pixels P for one row is included in a pixel line L. The plurality of light-receiving pixels P is provided side by side in the horizontal direction (lateral direction in FIGS. 1 and 2).

The light-receiving pixel P includes a photodiode PD, a transistor TRG, a floating diffusion FD, and transistors RST, AMP, and SEL. Each of the transistors TRG, RST, AMP, and SEL is an N-type MOS (Metal Oxide Semiconductor) transistor in this example.

The photodiode PD is a photoelectric conversion element that generates the amount of electric charge corresponding to the amount of received light and accumulates the generated electric charge inside. The anode of the photodiode PD is grounded and the cathode thereof is coupled to the source of the transistor TRG.

The gate of the transistor TRG is coupled to the control line TRGL, the source thereof is coupled to the cathode of the photodiode PD, and the drain thereof is coupled to the floating diffusion FD.

The floating diffusion FD is configured to accumulate the electric charge transferred from the photodiode PD through the transistor TRG. The floating diffusion FD includes, for example, a diffusion layer formed on a surface of the semiconductor substrate. FIG. 2 illustrates the floating diffusion FD by using the symbol of a capacitor.

The gate of the transistor RST is coupled to the control line RSTL, the drain thereof is coupled to a power supply node N1 and supplied with a power supply voltage VDDH, and the source thereof is coupled to the floating diffusion FD.

The gate of the transistor AMP is coupled to the floating diffusion FD, the drain thereof is coupled to the power supply node N1 and supplied with the power supply voltage VDDH, and the source thereof is coupled to the drain of the transistor SEL.

The gate of the transistor SEL is coupled to the control line SELL, the drain thereof is coupled to the source of the transistor AMP, and the source thereof is coupled to the signal line VSL.

This configuration causes the light-receiving pixel P to discharge the electric charge accumulated in the photodiode PD by turning on the transistors TRG and RST, for example, on the basis of the control signals STRG and SRST. An exposure period T is then started by turning off these transistors TRG and RST and the amount of electric charge corresponding to the amount of received light is accumulated in the photodiode PD. After the exposure period T ends, the light-receiving pixel P then outputs the signal SIG including a reset voltage Vreset and the pixel voltage Vpix to the signal line VSL. Specifically, first, the light-receiving pixel P is electrically coupled to the signal line VSL by turning on the transistor SEL on the basis of the control signal SSEL. This couples the transistor AMP to a constant current source 21 (described below) of the readout unit 20 and the transistor AMP operates as a so-called source follower. Then, in a P-phase (Pre-charge phase) period TP after the voltage of the floating diffusion FD is reset by turning on the transistor RST, the light-receiving pixel P outputs the voltage corresponding to the voltage of the floating diffusion FD at that time as the reset voltage Vreset as described below. In addition, in a D-phase (Data phase) period TD after the electric charge is transferred from the photodiode PD to the floating diffusion FD by turning on the transistor TRG, the light-receiving pixel P outputs the voltage corresponding to the voltage of the floating diffusion FD at that time as the pixel voltage Vpix. A difference voltage between the pixel voltage Vpix and the reset voltage Vreset corresponds to the amount of light received by the light-receiving pixel P in the exposure period T. In this way, the light-receiving pixel P outputs the signal SIG including these reset voltage Vreset and pixel voltage Vpix to the signal line VSL.

FIG. 3 illustrates a configuration example of a path for supplying the power supply voltage VDDH to the plurality of light-receiving pixels P in the pixel array 11. The imaging device 1 includes a power supply terminal TVDDH, a ground terminal TVSS, a switch 31, and discharge circuits 32 and 33.

The power supply terminal TVDDH is a terminal that supplies the imaging device 1 with the power supply voltage VDDH from the outside. The ground terminal TVSS is a terminal that supplies the imaging device 1 with a ground voltage TVSS from the outside.

The switch 31 is configured to supply the power supply voltage VDDH to the plurality of light-receiving pixels P in the pixel array 11 by being turned on. A terminal T1 of the switch 31 is coupled to the power supply node N1 led to the light-receiving pixel P and a terminal T2 thereof is coupled to a power supply node N2 led to the power supply terminal TVDDH. The switch 31 is turned on, for example, in a case where the imaging device 1 is supplied with power. In a case where power supply to the imaging device 1 is stopped, the switch 31 is turned off.

One end of the discharge circuit 32 is coupled to the power supply node N1 and the other end thereof is coupled to a ground node N3 led to the ground terminal TVSS. The discharge circuit 32 is configured to discharge electricity from the ground node N3 toward the power supply node N1. In other words, in a case where power supply to the imaging device 1 is stopped, the generation of negative electric charge corresponding to the amount of received light by the photodiode PD in the light-receiving pixel P (FIG. 2) of the pixel array 11 may decrease the voltage of the power supply node N1. In such a case, the discharge circuit 32 discharges electricity from the ground node N3 toward the power supply node N1.

One end of the discharge circuit 33 is coupled to the power supply node N2 and the other end thereof is coupled to the ground node N3. As with the discharge circuit 32, the discharge circuit 33 is configured to discharge electricity from the ground node N3 toward the power supply node N2.

FIG. 4 illustrates a specific example of the switch 31 and the discharge circuits 32 and 33 illustrated in FIG. 3. The imaging device 1 includes transistors MP31, MN32, and MN33, a resistor R34, and a controller 35. The transistor MP31 is a P-type MOS transistor and the transistors MN32 and MN33 are N-type MOS transistors.

The source of the transistor MP31 is coupled to the power supply node N2, the drain thereof is coupled to the power supply node N1, and the gate thereof is coupled to the resistor R34 and the controller 35. This gate is supplied with a power supply control signal SPC. The transistor MP31 corresponds to the switch 31 illustrated in FIG. 3. The transistor MP31 is disposed in the power supply path of the power supply voltage VDDH and it is thus desired that the on-resistance be lower. It is therefore desired that the transistor MP31 have a greater gate width.

The source of the transistor MN32 is coupled to the power supply node N1 and the drain and the gate thereof are coupled to the ground node N3. In other words, the gate and the drain of the transistor MN32 are coupled to each other by a so-called diode connection. The transistor MN32 corresponds to the discharge circuit 32 illustrated in FIG. 3.

The source of the transistor MN33 is coupled to the power supply node N2 and the drain and the gate thereof are coupled to the ground node N3. In other words, the gate and the drain of the transistor MN33 are coupled to each other by a so-called diode connection as with the transistor MN32. The transistor MN33 corresponds to the discharge circuit 33 illustrated in FIG. 3.

One end of the resistor R34 is coupled to the gate of the transistor MP31 and the controller 35 and the other end thereof is coupled to the ground node N3.

The controller 35 is configured to supply the power supply control signal SPC to the gate of the transistor MP31 and the one end of the resistor R34. For example, in a case where the imaging device 1 is supplied with power, the controller 35 sets the voltage of the power supply control signal SPC at the low level to bring the pixel array 11 into operation. In addition, the controller 35 is able to, for example, conduct an operation test on the transistor MP31 or control power supply to the pixel array 11 by changing the voltage of this power supply control signal SPC. In addition, in a case where power supply to the imaging device 1 is stopped, the gate voltage of the transistor MP31 is at the low level (ground level). For example, even in a case where the output impedance of the controller 35 is high impedance with power supply stopped, the gate of the transistor MP31 is coupled to the ground node N3 through the resistor R34. This makes it possible to set the gate voltage of the transistor MP31 at the ground level.

FIG. 5 illustrates a disposition example of the transistors MP31 (switches 31) in a semiconductor substrate 100 in which the imaging device 1 is formed. In this example, the imaging device 1 includes the four power supply terminals TVDDH. Each of the power supply terminals TVDDH is, for example, a pad electrode. The semiconductor substrate 100 is provided with a region R11 and four regions R31. The region R11 is a region in which the pixel array 11 is disposed. In this example, there is provided a power supply wiring line 101 in the region R11. This power supply wiring line 101 corresponds to the power supply node N1. The four regions R31 are regions in which the four transistors MP31 coupled to the four respective power supply terminals TVDDH are disposed. In this example, the four regions R31 are provided near the four corners of the region R11 in which the pixel array 11 is disposed. The four power supply terminals TVDDH are supplied with the power supply voltage VDDH from the outside. The power supply voltage VDDH is then supplied to the power supply wiring line 101 of the pixel array 11 through these four transistors MP31 by turning on these four transistors MP31.

It is to be noted that the four transistors MP31 are directly coupled to the four respective power supply terminals TVDDH in this example, but this is not limitative. Instead of this, for example, there may be provided a power supply ring wiring line coupled to the plurality of power supply terminals TVDDH and the four transistors MP31 may be coupled to the plurality of power supply terminals TVDDH through this power supply ring wiring line.

The driver 12 (FIG. 1) is configured to sequentially drive the plurality of light-receiving pixels P in the pixel array 11 in units of the pixel lines L on the basis of an instruction from the imaging controller 16. Specifically, the driver 12 drives the plurality of light-receiving pixels P in the pixel array 11 in units of the pixel lines L by supplying the plurality of respective control signals STRG to the plurality of control lines TRGL, supplying the plurality of respective control signals SRST to the plurality of control lines RSTL, and supplying the plurality of respective control signals SSEL to the plurality of control lines SELL in the pixel array 11.

The reference signal generator 13 is configured to generate a reference signal RAMP on the basis of an instruction from the imaging controller 16. The reference signal RAMP has a so-called ramp waveform in which a voltage level gradually changes with the lapse of time in the two periods (the P-phase period TP and the D-phase period TD) in which the readout unit 20 performs AD conversion. The reference signal generator 13 supplies the reference signal RAMP like this to the readout unit 20.

The readout unit 20 is configured to generate image data DT0 on the basis of an instruction from the imaging controller 16 by performing AD conversion on the basis of the signal SIG supplied from the pixel array 11 through the signal line VSL.

FIG. 6 illustrates a configuration example of the readout unit 20. It is to be noted that FIG. 6 also illustrates the reference signal generator 13, the signal processor 15, and the imaging controller 16 in addition to the readout unit 20. The readout unit 20 includes the plurality of constant current sources 21, a plurality of AD (Analog to Digital) converters ADC, and a transfer controller 27. The plurality of constant current sources 21 and the plurality of AD converters ADC are provided in association with the plurality of respective signal lines VSL. The following describes the constant current source 21 and the AD converter ADC corresponding to the one certain signal line VSL.

The constant current source 21 is configured to cause a predetermined current to flow through the corresponding signal line VSL. One end of the constant current source 21 is coupled to the corresponding signal line VSL and the other end thereof is grounded.

The AD converter ADC is configured to perform AD conversion on the basis of the signal SIG in the corresponding signal line VSL. The AD converter ADC includes capacitors 22 and 23, a comparison circuit 24, a counter 25, and a latch 26.

One end of the capacitor 22 is coupled to the signal line VSL and supplied with the signal SIG and the other end thereof is coupled to the comparison circuit 24. One end of the capacitor 23 is supplied with the reference signal RAMP supplied from the reference signal generator 13 and the other end thereof is coupled to the comparison circuit 24.

The comparison circuit 24 is configured to generate a signal CP by performing a comparison operation on the basis of the signal SIG supplied from the light-receiving pixel P through the signal line VSL and the capacitor 22 and the reference signal RAMP supplied from the reference signal generator 13 through the capacitor 23. The comparison circuit 24 sets an operating point by setting the voltages of the capacitors 22 and 23 on the basis of a control signal AZSW supplied from the imaging controller 16. After that, the comparison circuit 24 then performs a comparison operation of comparing the reset voltage Vreset included in the signal SIG and the voltage of the reference signal RAMP in the P-phase period TP and performs a comparison operation of comparing the pixel voltage Vpix included in the signal SIG and the voltage of the reference signal RAMP in the D-phase period TD.

The counter 25 is configured to perform a count operation of counting the pulses of a clock signal CLK supplied from the imaging controller 16 on the basis of the signal CP supplied from the comparison circuit 24. Specifically, in the P-phase period TP, the counter 25 generates a count value CNTP by counting the pulses of the clock signal CLK until the transition of the signal CP and outputs this count value CNTP as a digital code having a plurality of bits. In addition, in the D-phase period TD, the counter 25 generates a count value CNTD by counting the pulses of the clock signal CLK until the transition of the signal CP and outputs this count value CNTD as a digital code having a plurality of bits.

The latch 26 is configured to temporarily hold the digital code supplied from the counter 25 and output the digital code to a bus wiring line BUS on the basis of an instruction from the transfer controller 27.

The transfer controller 27 is configured to perform control on the basis of a control signal CTL supplied from the imaging controller 16 to cause the latches 26 of the plurality of AD converters ADC to sequentially output the digital codes to the bus wiring line BUS. The readout unit 20 uses this bus wiring line BUS to sequentially transfer the plurality of digital codes supplied from the plurality of AD converters ADC to the signal processor 15 as the image data DT0.

The signal processor 15 (FIG. 1) is configured to generate image data DT by performing predetermined image processing on the basis of the image data DT0 and an instruction from the imaging controller 16. The predetermined image processing includes, for example, a CDS (CDS; Correlated Double Sampling) process. In the CDS process, the signal processor 15 generates a pixel value VAL on the basis of the count value CNTP in the P-phase period TP and the count value CNTD obtained in the D-phase period TD by using the principle of correlated double sampling. The count value CNTP and the count value CNTD are included in the image data DT0.

The imaging controller 16 is configured to supply control signals to the driver 12, the reference signal generator 13, the readout unit 20, and the signal processor 15 and control operations of these circuits, thereby controlling an operation of the imaging device 1. Specifically, the imaging controller 16 performs control to cause the driver 12 to sequentially drive the plurality of light-receiving pixels P in the pixel array 11 in units of the pixel lines L by supplying the driver 12 with a control signal. In addition, the imaging controller 16 performs control by supplying the reference signal generator 13 with a control signal to cause the reference signal generator 13 to generate the reference signal RAMP. In addition, the imaging controller 16 performs control by supplying the readout unit 20 with a control signal to cause the readout unit 20 to generate the image data DT0 by performing AD conversion on the basis of the signal SIG. In addition, the imaging controller 16 controls an operation of the signal processor 15 by supplying the signal processor 15 with a control signal.

Here, the light-receiving pixel P corresponds to a specific example of a "light-receiving pixel" according to the present disclosure. The photodiode PD corresponds to a specific example of a "light receiver" according to the present disclosure. The power supply terminal TVDDH corresponds to a specific example of a "power supply terminal" according to the present disclosure. The ground terminal TVSS corresponds to a specific example of a "ground terminal" according to the present disclosure. The switch 31 and the transistor MP31 each correspond to a specific example of a "switch" according to the present disclosure. The transistor MP31 corresponds to a specific example of a "first transistor" according to the present disclosure. The controller 35 corresponds to a specific example of a "controller" according to the present disclosure. The discharge circuit 32 and the transistor MN32 each correspond to a specific example of a "first discharge circuit" according to the present disclosure. The transistor MN32 corresponds to a specific example of a "second transistor" according to the present disclosure. The discharge circuit 33 corresponds to a specific example of a "second discharge circuit" according to the present disclosure. The power supply node N1 corresponds to a specific example of a "first node" according to the present disclosure. The power supply node N2 corresponds to a specific example of a "second node" according to the present disclosure. The ground node N3 corresponds to a specific example of a "third node" according to the present disclosure. The region R31 corresponds to a specific example of a "first region" according to the present disclosure. The region R11 corresponds to a specific example of the "first region" according to the present disclosure. The region R31 corresponds to a specific example of a "second region" according to the present disclosure. The floating diffusion FD corresponds to a specific example of an "accumulation element" according to the present disclosure. The transistor TRG corresponds to a specific example of a "third transistor" according to the present disclosure. The transistor RST corresponds to a specific example of a "fourth transistor" according to the present disclosure.

Operations and Workings

Next, the operations and workings of the imaging device 1 according to the present embodiment are described.
(Overview of Overall Operation)

First, an overview of the overall operation of the imaging device 1 is described with reference to FIGS. 1 and 6. The driver 12 sequentially drives the plurality of light-receiving pixels P in the pixel array 11 in units of the pixel lines L on the basis of an instruction from the imaging controller 16. The reference signal generator 13 generates the reference signal RAMP on the basis of an instruction from the imaging controller 16. The light-receiving pixel P outputs the reset voltage Vreset as the signal SIG in the P-phase period TP and outputs the pixel voltage Vpix corresponding to the amount of received light as the signal SIG in the D-phase period TD. The readout unit 20 generates the image data DT0 on the basis of the signal SIG supplied from the pixel array 11 through the signal line VSL and an instruction from the imaging controller 16. Specifically, in the readout unit 20, the AD converter ADC generates the count value CNTP on the basis of the signal SIG by performing AD conversion in the P-phase period TP and outputs this count value CNTP as a digital code having a plurality of bits. In addition, the AD converter ADC generates the count value CNTD on the basis of the signal SIG by performing AD conversion in the D-phase period TD and outputs this count value CNTD as a digital code having a plurality of bits. The readout unit 20 sequentially supplies the plurality of digital codes including the count values CNTP generated by the plurality of AD converters ADC and the plurality of digital codes including the count values CNTD generated by the plurality of AD converters ADC to the signal processor 15 through the bus wiring line BUS as the image data DT0. The signal processor 15 generates the image data DT by performing predetermined image processing on the basis of the image data DT0 and an instruction from the imaging controller 16.

(Detailed Operation)

In the imaging device 1, each of the plurality of light-receiving pixels P accumulates electric charge in accordance with the amount of received light and generates the signal SIG including the pixel voltage Vpix corresponding to the amount of received light. The readout unit 20 then performs AD conversion on the basis of this signal SIG. The following describes this operation in detail.

FIG. 7 illustrates an example of an operation of scanning the plurality of light-receiving pixels P in the pixel array 11 in units of the pixel lines L.

The imaging device 1 performs exposure start driving D1 on the pixel array 11 in order from top in the vertical direction in the period from a timing t0 to a timing t1. Specifically, the driver 12 sequentially selects the pixel lines L, for example, by generating the control signals STRG and SRST. The driver 12 sequentially turns on the transistors TRG and RST in the light-receiving pixels P and keeps on the transistors TRG and RST for a time having a predetermined length. This sets the voltage of the floating diffusion FD and the voltage of the cathode of the photodiode PD to the power supply voltage VDDH in each of the light-receiving pixels P. In a case where the transistors TRG and RST are turned off, the photodiode PD then starts to accumulate electric charge in accordance with the amount of received light. In this way, the exposure periods T sequentially start in the plurality of light-receiving pixels P.

The imaging device 1 then performs readout driving D2 on the pixel array 11 in order from top in the vertical direction in the period from a timing t2 to a timing t3. Specifically, the driver 12 sequentially selects the pixel lines L by generating the control signals STRG, SRST, and SSEL as described below. This causes the light-receiving pixel P to output the reset voltage Vreset as the signal SIG in the P-phase period TP and output the pixel voltage Vpix as the signal SIG in the D-phase period TD. The readout unit 20 performs AD conversion on the basis of the signal SIG including the reset voltage Vreset and the pixel voltage Vpix outputted from the light-receiving pixel P.

The imaging device 1 repeats the exposure start driving D1 and the readout driving D2 like these. This allows the imaging device 1 to obtain a series of captured images.

Next, the readout driving D2 is described in detail. The following focuses on the certain light-receiving pixel P and describes operations of this light-receiving pixel P and the AD converter ADC coupled to the light-receiving pixel P in detail.

FIGS. 8A, 8B, 8C, 8D, 8E, 8F, 8G, and 8H illustrate an operation example of the readout driving D2. FIG. 8A illustrates the waveform of the control signal SSEL. FIG. 8B illustrates the waveform of the control signal SRST. FIG. 8C illustrates the waveform of the control signal STRG. FIG. 8D illustrates the waveform of the control signal AZSW. FIG. 8E illustrates the waveform of the reference signal RAMP. FIG. 8F illustrates the waveform of the signal SIG. FIG. 8G illustrates the waveform of the clock signal CLK. FIG. 8H illustrates the waveform of the signal CP. FIGS. 8E and 8F illustrate the waveforms of the reference signal RAMP and the signal SIG by using the same voltage axis. In addition, in this description, the waveform of the reference signal RAMP illustrated in FIG. 8E is the waveform of a voltage supplied to the input terminal of the comparison circuit 24 through the capacitor 23. The waveform of the signal SIG illustrated in FIG. 8F is the waveform of a voltage supplied to the input terminal of the comparison circuit 24 through the capacitor 22.

First, a horizontal period H starts at a timing t11. This causes the driver 12 to change the voltage of the control signal SSEL from the low level to the high level (FIG. 8A). This turns on the transistor SEL in the light-receiving pixel P. The light-receiving pixel P is electrically coupled to the signal line VSL. In addition, the driver 12 changes the voltage of the control signal SRST from the low level to the high level at this timing t11 (FIG. 8B). This turns on the transistor RST in the light-receiving pixel P. The voltage of the floating diffusion FD is set to the power supply voltage VDDH (reset operation). The light-receiving pixel P then outputs a voltage corresponding to the voltage of the floating diffusion FD at this time. In addition, the imaging controller 16 changes the voltage of the control signal AZSW from the low level to the high level at this timing t11 (FIG. 8D). This causes the comparison circuit 24 of the AD converter ADC to set an operating point by setting the voltages of the capacitors 22 and 23. In this way, the voltage of the signal SIG is set to the reset voltage Vreset and the voltage of the reference signal RAMP is set to the same voltage as the voltage (reset voltage Vreset) of the signal SIG (FIGS. 8E and 8F).

The driver 12 then changes the voltage of the control signal SRST from the high level to the low level at a timing t12 (FIG. 8B). This turns off the transistor RST in the light-receiving pixel P and finishes the reset operation.

Next, the imaging controller 16 changes the voltage of the control signal AZSW from the high level to the low level at a timing t13 (FIG. 8D). This causes the comparison circuit 24 to finish setting an operating point.

In addition, the reference signal generator 13 changes the voltage of the reference signal RAMP to a voltage V1 at this timing t13 (FIG. 8E). This makes the voltage of the reference signal RAMP higher than the voltage of the signal SIG. The comparison circuit 24 thus changes the voltage of the signal CP from the low level to the high level (FIG. 8H).

In the period (P-phase period TP) from a timing t14 to a timing t16, the AD converter ADC then performs AD conversion on the basis of the signal SIG. Specifically, first, at the timing t14, the reference signal generator 13 starts to decrease the voltage of the reference signal RAMP from the voltage V1 at a predetermined change rate (FIG. 8E). In addition, at this timing t14, the imaging controller 16 starts to generate the clock signal CLK (FIG. 8G). The counter 25 of the AD converter ADC counts the pulses of this clock signal CLK by performing a count operation.

At a timing t15, the voltage of the reference signal RAMP then falls below the voltage (reset voltage Vreset) of the signal SIG (FIGS. 8E and 8F). This causes the comparison circuit 24 of the AD converter ADC to change the voltage of the signal CP from the high level to the low level (FIG. 8H). The counter 25 of the AD converter ADC stops the count operation on the basis of this transition of the signal CP. The count value (count value CNTP) of the counter 25 at this time is a value corresponding to the reset voltage Vreset. The latch 26 holds this count value CNTP. The counter 25 then resets the count value.

Next, the imaging controller 16 stops generating the clock signal CLK at the end of the P-phase period TP at the timing t16 (FIG. 8G). In addition, the reference signal generator 13 sets the voltage of the reference signal RAMP to a voltage V2 at this timing t16 (FIG. 8E). In the period from this timing t16 or a later timing, the readout unit 20 then supplies the count value CNTP held by the latch 26 to the signal processor 15 as the image data DT0.

Next, the imaging controller 16 sets the voltage of the reference signal RAMP to the voltage V1 at a timing t17 (FIG. 8E). This makes the voltage of the reference signal RAMP higher than the voltage (reset voltage Vreset) of the signal SIG. The comparison circuit 24 thus changes the voltage of the signal CP from the low level to the high level (FIG. 8H).

Next, the driver 12 changes the voltage of the control signal STRG from the low level to the high level at a timing t18 (FIG. 8C). This turns on the transistor TRG in the light-receiving pixel P. The electric charge generated by the photodiode PD is transferred to the floating diffusion FD (electric charge transfer operation). The light-receiving pixel P then outputs a voltage corresponding to the voltage of the floating diffusion FD at this time. In this way, the voltage of the signal SIG is changed to the pixel voltage Vpix (FIG. 8F).

The driver 12 then changes the voltage of the control signal STRG from the high level to the low level at a timing t19 (FIG. 8C). This turns off the transistor TRG in the light-receiving pixel P and finishes the electric charge transfer operation.

In the period (D-phase period TD) from a timing t20 to a timing t22, the AD converter ADC then performs AD conversion on the basis of the signal SIG. Specifically, first, at the timing t20, the reference signal generator 13 starts to decrease the voltage of the reference signal RAMP from the voltage V1 at a predetermined change rate (FIG. 8E). In addition, at this timing t20, the imaging controller 16 starts to generate the clock signal CLK (FIG. 8G). The counter 25 of the AD converter ADC counts the pulses of this clock signal CLK by performing a count operation.

At a timing t21, the voltage of the reference signal RAMP then falls below the voltage (pixel voltage Vpix) of the signal SIG (FIGS. 8E and 8F). This causes the comparison circuit 24 of the AD converter ADC to change the voltage of the signal CP from the high level to the low level (FIG. 8H). The counter 25 of the AD converter ADC stops the count operation on the basis of this transition of the signal CP. The count value (count value CNTD) of the counter 25 at this time is a value corresponding to the pixel voltage Vpix. The latch 26 holds this count value CNTD. The counter 25 then resets the count value.

Next, the imaging controller 16 stops generating the clock signal CLK at the end of the D-phase period TD at the timing t22 (FIG. 8G). In addition, the reference signal generator 13 sets the voltage of the reference signal RAMP to a voltage V3 at this timing t22 (FIG. 8E). In the period from this timing t22 or a later timing, the readout unit 20 then supplies the count value CNTD held by the latch 26 to the signal processor 15 as the image data DT0.

Next, the driver 12 changes the voltage of the control signal SSEL from the high level to the low level at a timing t23 (FIG. 8A). This turns off the transistor SEL in the light-receiving pixel P. The light-receiving pixel P is electrically uncoupled from the signal line VSL.

In this way, the readout unit 20 supplies the image data DT0 including the count values CNTP and CNTD to the signal processor 15. The signal processor 15 generates the pixel value VAL, for example, on the basis of the count values CNTP and CNTD included in the image data DT0 by using the principle of correlated double sampling. Specifically, the signal processor 15 generates the pixel value VAL, for example, by subtracting the count value CNTP from the count value CNTD. In this way, the signal processor 15 generates the image data DT by performing a predetermined process.

(Regarding a Discharge Operation in a Case Where the Device Power Supply is Off)

In a case where power supply to the imaging device 1 is stopped, the generation of negative electric charge corresponding to the amount of received light by the photodiode PD in the light-receiving pixel P of the pixel array 11 may cause a negative voltage. The imaging device 1 makes it possible to protect the imaging device 1 and a device coupled to the imaging device 1 from such a negative voltage. The following describes this operation in detail.

FIG. 9 illustrates an example of a discharge operation of the imaging device 1. In a case where the photodiode PD generates negative electric charge corresponding to the amount of received light, the voltage of the cathode of the photodiode PD decreases. As a result, the transistor TRG may be turned on. In a case where the negative electric charge is transferred to the floating diffusion FD, the voltage of the floating diffusion FD then decreases. As a result, the transistor RST may be turned on. In this case, the voltage of the power supply node N1 decreases. In a case where power supply to the imaging device 1 is stopped, the switch 31 (the transistor MP31 in this example) is turned off. This causes the discharge circuit 32 (the transistor MN32 in this example) to discharge electricity from the ground node N3 toward the power supply node N1. Specifically, a discharge current I1 flows through the ground node N3, the transistor MN32, the power supply node N1, the transistor RST, the floating diffusion FD, the transistor TRG, and the photodiode PD in this order. This makes it possible in the imaging device 1 to reduce the possibility that the voltage at the power supply terminal TVDDH decreases.

In other words, in a case where the switch 31 and the discharge circuits 32 and 33 are not provided, for example, as in an imaging device 1R illustrated in FIG. 10, the voltage at the power supply terminal TVDDH may decrease. In this example, there is provided a power supply protection circuit 40 between the power supply terminal TVDDH and the ground terminal TVSS. This power supply protection circuit 40 is configured to, in a case where a positive overvoltage is applied to the power supply terminal TVDDH, protect the imaging device 1R from this overvoltage. In this example, the power supply protection circuit 40 includes a transistor MN41. The transistor MN41 is an N-type MOS transistor. The drain of the transistor MN41 is coupled to the power supply terminal TVDDH and the source thereof is coupled to the ground terminal TVSS. In a case where a discharge current I2 flows through this transistor MN41 as illustrated in FIG. 10, the voltage of the power supply terminal TVDDH is a voltage that is lower than the voltage at the ground terminal TVSS by the threshold voltage of the transistor MN41. The transistor MN41 used in the power supply protection circuit 40 is a high-withstand-voltage transistor and the absolute value of the threshold voltage is thus large in general. Therefore, the voltage at the power supply terminal TVDDH may significantly decrease and exceed the maximum rated voltage. In a case where the maximum rated voltage is exceeded in this way, for example, the reliability of the imaging device 1R may decrease or the imaging device 1R may be broken. Further, for example, the reliability of an external device coupled to the power supply terminal TVDDH of this imaging device 1R may also decrease or this external device may also be broken.

In contrast, the imaging device 1 according to the present embodiment is provided with the switch 31 (e.g., transistor MP31) and the discharge circuits 32 and 33 (e.g., transistors MN32 and MN33) as illustrated in FIGS. 3 and 4. This electrically uncouples the power supply node N1 and the power supply terminal TVDDH from each other because the switch 31 is off in a case where power supply to the imaging device 1 is stopped as illustrated in FIG. 9. This causes the discharge current I1 to flow through the discharge circuit 32 (transistor MN32) and it is thus possible to reduce the possibility that the voltage of a power supply voltage TVDDH decreases. In addition, even in a case where a discharge current flows a little through the switch 31, this discharge current flows through the discharge circuit 33 (transistor MN33). It is thus possible to reduce the possibility that the voltage of the power supply voltage TVDDH decreases.

In this way, as illustrated in FIG. 3, the imaging device 1 includes the switch 31 and the discharge circuit 32. The switch 31 includes the terminal T1 and the terminal T2. The terminal T1 is coupled to the power supply node N1 led to the photodiode PD. The terminal T2 is coupled to the power supply node N2 led to the power supply terminal TVDDH. The switch 31 couples the power supply node N1 and the power supply node N2 by being turned on. The discharge circuit 32 is coupled to the power supply node N1 and the ground node N3 led to the ground terminal TVSS. The discharge circuit 32 is configured to discharge electricity from the ground node N3 toward the power supply node N1. This makes it possible in the imaging device 1 to reduce the possibility that the voltage of the power supply voltage TVDDH decreases even in a case where the photodiode PD generates negative electric charge corresponding to the amount of received light with power supply to the imaging device 1 stopped. As a result, it is possible in the imaging device 1 to protect a circuit from a voltage corresponding to the amount of received light.

In addition, the imaging device 1 includes the discharge circuit 33 coupled to the power supply node N2 and the ground node N3 as illustrated in FIG. 3. This makes it possible to reduce the possibility that the voltage of the power supply voltage TVDDH decreases in a case where power supply to the imaging device 1 is stopped. As a result, it is possible in the imaging device 1 to protect a circuit from a voltage corresponding to the amount of received light.

Effects

As described above, in the present embodiment, the switch and the discharge circuit are provided. The switch includes the terminal T1 and the terminal T2. The terminal T1 is coupled to the power supply node N1 led to the photodiode. The terminal T2 is coupled to the power supply node N2 led to the power supply terminal. The switch couples the power supply node N1 and the power supply node N2 by being turned on. The discharge circuit is coupled to the power supply node N1 and the ground node led to the ground terminal. The discharge circuit is configured to discharge electricity from the ground node N3 toward the power supply node N1. This makes it possible to protect a circuit from a voltage corresponding to the amount of light in a case where power supply to the imaging device is stopped.

In the present embodiment, the discharge circuit is provided that is coupled to the power supply node N2 and the ground node N3. This makes it possible to protect a circuit from a voltage corresponding to the amount of received light in a case where power supply to the imaging device is stopped.

Modification Example 1

In the embodiment described above, as illustrated in FIG. 4, the gate of the transistor MP31 is supplied with the power supply control signal SPC, but this is not limitative. Instead of this, the gate of the transistor MP31 may be coupled to the ground terminal TVSS, for example, as in an imaging device 1A illustrated in FIG. 11. Even in this configuration, the transistor MP31 is turned on in a case where the imaging device 1A is supplied with power. The transistor MP31 is turned off in a case where power supply to the imaging device 1A is stopped.

Modification Example 2

In the embodiment described above, as illustrated in FIGS. 3 and 4, the transistor MN32 is used as the discharge circuit 32 and the transistor MN33 is used as the discharge circuit 33, but this is not limitative. Instead of this, for example, as in an imaging device 1B illustrated in FIG. 12, a diode D32 may be used as the discharge circuit 32 and a diode D33 may be used as the discharge circuit 33. The anode of the diode D32 is coupled to the ground node N3 and the cathode thereof is coupled to the power supply node N1. The anode of the diode D33 is coupled to the ground node N3 and the cathode thereof is coupled to the power supply node N2. In addition, for example, as in an imaging device 1C illustrated in FIG. 13, a resistor R32 may be used as the discharge circuit 32 and a resistor R33 may be used as the discharge circuit 33. One end of the resistor R32 is coupled to the power supply node N1 and the other end thereof is coupled to the ground node N3. One end of the resistor R33 is coupled to the power supply node N2 and the other end thereof is coupled to the ground node N3. It is to be noted that the discharge circuit 32 and the discharge circuit 33 include the same type of elements in this example, but this is not limitative. The discharge circuit 32 and the discharge circuit 33 may include different types of elements. Specifically, for example, the diode D32 (FIG. 12) may be used as the discharge circuit 32 and the transistor MN33 (FIG. 4) may be used as the discharge circuit 33.

Modification Example 3

In the embodiment described above, as illustrated in FIG. 5, the transistors MP31 (switches 31) are disposed at four portions, but this is not limitative. Instead of this, for example, as illustrated in FIG. 14, the transistors MP31 may be disposed in a larger region. This semiconductor substrate 100D is provided with the two regions R31. The transistors MP31 are disposed in the two regions R31. The two respective regions R31 are provided along the left side and the right side of the region R11 in which the pixel array 11 is disposed.

Modification Example 4

In the embodiment described above, each of the plurality of light-receiving pixels P includes the floating diffusion FD, but this is not limitative. Instead of this, for example, the plurality of light-receiving pixels P may include the one floating diffusion FD. The following describes an imaging device 1E according to the present modification example in detail.

FIG. 15 illustrates a configuration example of the imaging device 1E according to the present modification example. The imaging device 1E includes a pixel array 11E. In the pixel array 11E, the plurality of light-receiving pixels P is disposed by using the four light-receiving pixels P disposed in two rows and two columns as a unit (pixel units U).

FIG. 16 illustrates a configuration example of the pixel unit U. The pixel array 11E includes a plurality of control lines TRGL1, a plurality of control lines TRGL2, a plurality of control lines TRGL3, a plurality of control lines TRGL4, the plurality of control lines RSTL, the plurality of control lines SELL, and the plurality of signal lines VSL.

The pixel unit U includes the four photodiodes PD (photodiodes PD1 to PD4), the four transistors TRG (transistors TRG1 to TRG4), the floating diffusion FD, and the transistors RST, AMP, and SEL. The photodiode PD1, the transistor TRG1, the floating diffusion FD, and the transistors RST, AMP, and SEL are included in the one light-receiving pixel P (light-receiving pixel P1). The photodiode PD2, the transistor TRG2, the floating diffusion FD, and the transistors RST, AMP, and SEL are included in the one light-receiving pixel P (light-receiving pixel P2). The photodiode PD3, the transistor TRG3, the floating diffusion FD, and the transistors RST, AMP, and SEL are included in the one light-receiving pixel P (light-receiving pixel P3). The photodiode PD4, the transistor TRG4, the floating diffusion FD, and the transistors RST, AMP, and SEL are included in the one light-receiving pixel P (light-receiving pixel P4).

This configuration causes the pixel unit U to discharge the electric charge accumulated in the photodiode PD1 by turning on, for example, the transistors TRG1 and RST. The exposure period T is then started by turning off these transistors TRG1 and RST and the amount of electric charge corresponding to the amount of received light is accumulated in the photodiode PD1. After the exposure period T ends, the light-receiving pixel P1 including this photodiode PD1 then outputs the signal SIG including the reset voltage Vreset and the pixel voltage Vpix to the signal line VSL. The same applies to the other three light-receiving pixels P2 to P4.

It is to be noted that the four light-receiving pixels P include the one floating diffusion FD in this example, but this is not limitative. The three or fewer or five or more light-receiving pixels P may include the one floating diffusion FD.

Other Modification Examples

In addition, two or more of these modification examples may be combined.

2. Usage Example of Imaging Device

FIG. 17 illustrates a usage example of the imaging device 1 according to the embodiment described above. For example, the imaging device 1 described above is usable in a variety of cases of sensing light such as visible light, infrared light, ultraviolet light, and X-rays as follows.

Devices that shoot images for viewing such as digital cameras and mobile devices having a camera function Devices for traffic use such as onboard sensors that shoot images of the front, back, surroundings, inside, and so on of an automobile for safe driving such as automatic stop and for recognition of a driver's state, monitoring cameras that monitor traveling vehicles and roads, and distance measurement sensors that measure vehicle-to-vehicle distance Devices for use in home electrical appliances such as televisions, refrigerators, and air-conditioners to shoot images of a user's gesture and bring the appliances into operation in accordance with the gesture Devices for medical care and health care use such as endoscopes and devices that shoot images of blood vessels by receiving infrared light Devices for security use such as monitoring cameras for crime prevention and cameras for individual authentication Devices for beauty use such as skin measurement devices that shoot images of skin and microscopes that shoot images of scalp Devices for sports use such as action cameras and wearable cameras for sports applications and the like Devices for agricultural use such as cameras for monitoring the states of fields and crops

3. Example of Application to Mobile Body

The technology (the present technology) according to the present disclosure is applicable to a variety of products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, or a robot.

FIG. 18 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 18, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 18, an audio speaker 12061, a display section 12062, and an instrument panel 12063 are illustrated as the output device. The display section 12062 may, for example, include at least one of an on-board display and a head-up display.

FIG. 19 is a diagram depicting an example of the installation position of the imaging section 12031.

In FIG. 19, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 19 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to the present disclosure may be applied has been described above. The technology according to the present disclosure may be applied to the imaging section 12031 among the components described above. In other words, in a case where the imaging device 1 mounted on a vehicle is not used, power supply to the imaging device 1 is stopped. For example, in a case where the vehicle is parked outdoors in the daytime, intense light such as sunlight may enter the imaging device 1. In this case, the photodiode PD generates negative electric charge corresponding to the amount of received light in the light-receiving pixel P of the pixel array 11 and a negative voltage is caused. It is possible in the imaging device 1 to protect the imaging device 1 and a device coupled to the imaging device 1 from such a negative voltage.

Although the present technology has been described with reference to the embodiment and the modification examples and specific application examples thereof, the present technology is not limited to the embodiment or the like. The present technology may be modified in a variety of ways.

For example, in the embodiment described above, the light-receiving pixels P each having the configuration as illustrated in FIG. 2 are used, but this is not limitative. It is possible to use light-receiving pixels having a variety of configurations.

For example, in the embodiment described above, the present technology is applied to the imaging device, but this is not limitative. The present technology is applicable to a variety of devices that each detect light. FIG. 20 illustrates a configuration example of a distance measurement device 2 to which the present technology is applied. The distance measurement device 2 is a ToF (Time-of-Flight) sensor that uses an indirect method. The distance measurement device 2 is configured to measure the distance to a measurement object OBJ. The distance measurement device 2 includes a light emitter 51, an optical system 52, a photodetector 53, and a controller 54.

The light emitter 51 is configured to emit a light pulse L0 toward the measurement object OBJ on the basis of an instruction from the controller 54. The light emitter 51 emits the light pulse L0 on the basis of an instruction from the controller 54 by performing a light emission operation of alternately repeating the emission and non-emission of light. The light emitter 51 includes, for example, a light source that emits infrared light. This light source includes, for example, a laser light source, an LED (Light Emitting Diode), or the like.

The optical system 52 includes a lens that forms an image on a light-receiving surface S of the photodetector 53. A light pulse (reflection light pulse L1) emitted from the light emitter 51 and reflected by the measurement object OBJ enters this optical system 52.

The photodetector 53 is configured to detect light to generate a distance image on the basis of an instruction from the controller 54. Each of a plurality of pixel values included in the distance image indicates a value about a distance D to the measurement object OBJ. The photodetector 53 then outputs the generated distance image as image data DT2.

The controller 54 is configured to supply the light emitter 51 and the photodetector 53 with control signals and control operations of these light emitter 51 and photodetector 53, thereby controlling an operation of the distance measurement device 2.

The photodiode PD of the photodetector 53 generates negative electric charge corresponding to the amount of received light and a negative voltage is caused in the distance measurement device 2 like this in a case where power supply to the distance measurement device 2 is stopped. The application of the present technology makes it possible in the distance measurement device 2 to protect the distance measurement device 2 and a device coupled to the distance measurement device 2 from such a negative voltage.

It is to be noted that the effects described in the present specification are merely illustrative, but not limited. In addition, other effects may be included.

It is to be noted that the present technology may be configured as below. The present technology having the following configurations makes it possible to protect a circuit from a voltage corresponding to the amount of received light in a case where power supply is stopped.

(1)
A photodetection device including:
a light-receiving pixel including a light receiver that generates electric charge corresponding to an amount of received light;
a power supply terminal;
a ground terminal;
a switch including a first terminal and a second terminal, the first terminal being coupled to a first node led to the light receiver, the second terminal being coupled to a second node led to the power supply terminal, the switch coupling the first node and the second node by being turned on; and
a first discharge circuit coupled to the first node and a third node led to the ground terminal, the first discharge circuit being configured to discharge electricity from the third node toward the first node.

(2)
The photodetection device according to (1), in which the switch is off in a case where the power supply terminal of the photodetection device is supplied with no power.

(3)
The photodetection device according to (1) or (2), in which the switch includes a first transistor including a gate, a source coupled to the second node, and a drain coupled to the first node.

(4)
The photodetection device according to (3), further including a controller that drives the gate of the first transistor.

(5)
The photodetection device according to (3), in which the gate of the first transistor is coupled to the third node.

(6)
The photodetection device according to any of (1) to (5), including a plurality of the light-receiving pixels, in which
the first terminal of the switch is led to the light receivers of the plurality of light-receiving pixels,
the plurality of light-receiving pixels is provided in a first region, and
the switch is provided in a second region outside the first region.

(7)
The photodetection device according to any of (1) to (6), in which the first discharge circuit includes a second transistor including a gate, a drain coupled to the third node, and a source coupled to the first node.

(8)
The photodetection device according to any of (1) to (6), in which the first discharge circuit includes a diode including an anode coupled to the third node and a cathode coupled to the first node.

(9)
The photodetection device according to any of (1) to (6), in which the first discharge circuit includes a resistor including a first terminal coupled to the third node and a second terminal coupled to the first node.

(10)
The photodetection device according to any of (1) to (9), further including a second discharge circuit coupled to the second node and the third node.

(11)
The photodetection device according to any of (1) to (10), in which the light-receiving pixel further includes
an accumulation element that accumulates electric charge generated by the light receiver,
a third transistor including a gate, a source coupled to the light receiver, and a drain coupled to the accumulation element, and
a fourth transistor including a gate, a drain coupled to the first node, and a source coupled to the accumulation element.

This application claims the priority on the basis of Japanese Patent Application No. 2020-150643 filed on Sep. 8, 2020 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A photodetection device, comprising:
a pixel array including a plurality of light-receiving pixels, wherein
each of the plurality of light-receiving pixels includes a light receiver configured to generate an electric charge corresponding to an amount of received light, and
the pixel array is in a first region corresponding to the photodetection device;
a power supply terminal;
a ground terminal;
a switch including a first terminal and a second terminal, wherein
the first terminal is coupled to a first node led to the light receiver,
the second terminal is coupled to a second node led to the power supply terminal,
the switch is configured to couple the first node and the second node by being turned on,
the switch is in a second region corresponding to the photodetection device, and
the second region is outside the first region; and
a first discharge circuit coupled to the first node and a third node led to the ground terminal, the first discharge circuit being configured to discharge electricity from the third node toward the first node.

2. The photodetection device according to claim 1, wherein the switch is off in a case where the power supply terminal of the photodetection device is supplied with no power.

3. The photodetection device according to claim 1, wherein the switch includes a first transistor including a gate, a source coupled to the second node, and a drain coupled to the first node.

4. The photodetection device according to claim 3, further comprising a controller configured to drive the gate of the first transistor.

5. The photodetection device according to claim 3, wherein the gate of the first transistor is coupled to the third node.

6. The photodetection device according to claim 1, wherein the first discharge circuit includes a second transistor including a gate, a drain coupled to the third node, and a source coupled to the first node.

7. The photodetection device according to claim 1, wherein the first discharge circuit includes a diode including an anode coupled to the third node and a cathode coupled to the first node.

8. The photodetection device according to claim 1, wherein the first discharge circuit includes a resistor including a first terminal coupled to the third node and a second terminal coupled to the first node.

9. The photodetection device according to claim 1, further comprising a second discharge circuit coupled to the second node and the third node.

10. The photodetection device according to claim 1, wherein each of the plurality of light-receiving pixels further includes
- an accumulation element configured to accumulate the electric charge generated by the light receiver,
- a third transistor including a gate, a source coupled to the light receiver, and a drain coupled to the accumulation element, and
- a fourth transistor including a gate, a drain coupled to the first node, and a source coupled to the accumulation element.

* * * * *